US012508990B2

(12) United States Patent
Lee

(10) Patent No.: US 12,508,990 B2
(45) Date of Patent: Dec. 30, 2025

(54) VEHICLE AND METHOD OF CONTROLLING THE SAME

(71) Applicants: Hyundai Motor Company, Seoul (KR); Kia Corporation, Seoul (KR)

(72) Inventor: Dong Hoon Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 198 days.

(21) Appl. No.: 17/813,268

(22) Filed: Jul. 18, 2022

(65) Prior Publication Data

US 2023/0150431 A1 May 18, 2023

(30) Foreign Application Priority Data

Nov. 18, 2021 (KR) .................. 10-2021-0159088

(51) Int. Cl.
*B60R 1/07* (2006.01)
*B60Q 9/00* (2006.01)
*B60R 1/072* (2006.01)
*G08G 1/0967* (2006.01)

(52) U.S. Cl.
CPC .............. *B60R 1/072* (2013.01); *B60Q 9/008* (2013.01); *G08G 1/096783* (2013.01)

(58) Field of Classification Search
CPC ... B60R 1/072; B60Q 9/008; G08G 1/096783
See application file for complete search history.

(56) References Cited

U.S. PATENT DOCUMENTS

| 8,775,031 B1* | 7/2014 | Bankhead | B60R 1/025 |
| | | | 701/22 |
| 2010/0198478 A1* | 8/2010 | Shin | B60W 10/06 |
| | | | 701/96 |
| 2011/0098911 A1* | 4/2011 | Ellanti | G08G 1/167 |
| | | | 715/764 |

(Continued)

FOREIGN PATENT DOCUMENTS

JP 2007331490 A 12/2007

OTHER PUBLICATIONS

Korean Intellectual Property Office Notice of Submission, "Name and Vehicle and its Control Method," KR 10-2021-0159088, dated Oct. 24, 2025, with English Translation, 16 pages.

*Primary Examiner* — Joan T Goodbody
*Assistant Examiner* — Godfrey Aleksander Maciorowski
(74) *Attorney, Agent, or Firm* — SLATER MATSIL, LLP

(57) ABSTRACT

An embodiment vehicle includes a sensor configured to acquire surrounding state data of the vehicle and internal state data of the vehicle, a communicator configured to communicate with a nearby vehicle, a side mirror having an angle that is adjustable, and a controller configured to identify whether an automatic mirror control of the vehicle is performable based on the surrounding state data, the internal state data, and a communication between the communicator and the nearby vehicle, in response to identifying that the automatic mirror control of the vehicle is performable, to identify that the nearby vehicle is expected to cross the vehicle based on the communication and to identify an angle between a heading direction of the nearby vehicle and a heading direction of the vehicle, and to control an angle of the side mirror based on the identified angle.

18 Claims, 14 Drawing Sheets

(56) References Cited

U.S. PATENT DOCUMENTS

| | | | |
|---|---|---|---|
| 2014/0114500 A1* | 4/2014 | Noh | B60R 1/007 |
| | | | 701/2 |
| 2016/0107579 A1* | 4/2016 | Quinn | B60R 1/074 |
| | | | 359/841 |
| 2016/0203719 A1* | 7/2016 | Divekar | B60T 7/18 |
| | | | 348/118 |
| 2020/0346581 A1* | 11/2020 | Lawson | B60R 1/0612 |

* cited by examiner

VEHICLE AND METHOD OF CONTROLLING THE SAME

CROSS-REFERENCE TO RELATED APPLICATIONS

This application claims the benefit of Korean Patent Application No. 10-2021-0159088, filed on Nov. 18, 2021, which application is hereby incorporated herein by reference.

TECHNICAL FIELD

The disclosure relates to a vehicle and a method of controlling the same.

BACKGROUND

Recently, various advanced driver assistance systems (ADASs) have been developed for autonomous travelling for the convenience of drivers. In particular, the autonomous travelling market was expected to have a considerable growth from 2020, and research on ADAS has been actively conducted.

Examples of ADASs mounted on vehicles include a forward collision avoidance (FCA) system, an autonomous emergency brake (AEB) system, a driver attention warning (DAW) system, and the like. Such a system provides a collision avoidance and warning system that identifies a collision risk with an object in a travelling situation of a vehicle and performs collision avoidance and warning through emergency braking in a collision situation.

However, in the conventional ADAS, when a driver inputs a left turn and/or a right turn signal of a vehicle with a multi-function switch, a rear image is displayed based on a rear camera in the corresponding direction, and there is no way of acquiring a rear image without the driver separately manipulating the multi-function switch. In addition, even when the multi-function switch is manipulated, there is a difficulty in identifying a vehicle approaching from the left on a right turn merging road.

Accordingly, in the conventional ADAS, when vehicles travel and enter a merging road, such as a highway or other roads, a difference in heading direction between a travelling vehicle and an entering vehicle causes a difficulty in identifying a vehicle that merges on the road with a side mirror of the vehicle. Accordingly, the driver needs to separately adjust the side mirror or lower the vehicle window to check the vehicle approaching from the rear.

SUMMARY

The disclosure relates to a vehicle and a method of controlling the same. Particular embodiments relate to a vehicle for controlling a side mirror of the vehicle based on vehicle to everything (V2X) communication and a method of controlling the same.

Therefore, an embodiment of the disclosure provides a vehicle and a method of controlling the same that are capable of providing convenience to the driver by controlling a side mirror at a vehicle merging road section based on vehicle to everything (V2X) communication.

The technical features of embodiments of the disclosure are not limited to the above, and other features may become apparent to those of ordinary skill in the art based on the following descriptions.

According to an embodiment of the disclosure, there is provided a vehicle including a sensor configured to acquire surrounding state data of the vehicle and internal state data of the vehicle, a communicator configured to communicate with at least one nearby vehicle, a side mirror having an angle that is adjusted in at least one of a horizontal direction or a vertical direction, and a controller including a processor configured to process the data and the communication, wherein the controller is configured to identify, based on processing the data and the communication, whether an automatic mirror control of the vehicle is performable, identify, upon identifying that the automatic mirror control of the vehicle is performable, an object that is a nearby vehicle expected to cross the vehicle among the nearby vehicles based on processing the communication, identify an angle between a heading direction of the identified object and a heading direction of the vehicle, and control an angle of the side mirror based on the identified angle.

The controller may be configured to identify whether the automatic mirror control of the vehicle is performable based on at least one of the angle of the side mirror, whether the sensor is normal, or a communication state with the nearby vehicle.

The controller may be further configured to communicate with an infrastructure in front of the identified object, wherein the controller may be configured to, based on further processing the communication with the infrastructure, identify the object expected to cross the vehicle among the nearby vehicles.

The controller may be configured to, in response to the angle between the vehicle and the identified object being greater than or equal to a predetermined angle, control the angle of the side mirror.

The controller may be configured to, based on at least one of a velocity of the nearby vehicle, information about a multi-function switch, or information about wheel steering based on the processing of the communication, identify the object expected to cross the vehicle among the nearby vehicles.

The controller may be configured to, based on the processing of the data, identify a visible area of a driver of the vehicle and control the angle of the side mirror such that the identified object is included in the identified visible area.

The controller may be configured to identify that the automatic mirror control of the vehicle is not performable in response to at least one of an operation of a rear collision warning system of the vehicle or an adjustment of the angle of the side mirror by the driver being identified based on the processing of the data.

The controller may be configured to, in response to a velocity of the identified object being greater than or equal to a predetermined velocity, generate a control signal for controlling at least one of a display device or an audio device of the vehicle.

The controller may be configured to, in response to no object being identified as expected to cross the vehicle based on the processing of the data, control the side mirror at an angle of the side mirror before the control.

According to another aspect of the disclosure, there is provided a method of controlling a vehicle, the method including acquiring, by a sensor, surrounding state data of the vehicle and internal state data of the vehicle, communicating with at least one nearby vehicle, identifying, based on processing the data and the communication, whether an automatic mirror control of the vehicle is performable, identifying, upon identifying that the automatic mirror control of the vehicle is performable, an object that is a nearby vehicle expected to cross the vehicle among the nearby vehicles based on processing the communication, identifying an angle between a heading direction of the identified object and a heading direction of the vehicle, and controlling an angle of a side mirror based on the identified angle.

BRIEF DESCRIPTION OF THE DRAWINGS

These and/or other embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Figure 1:
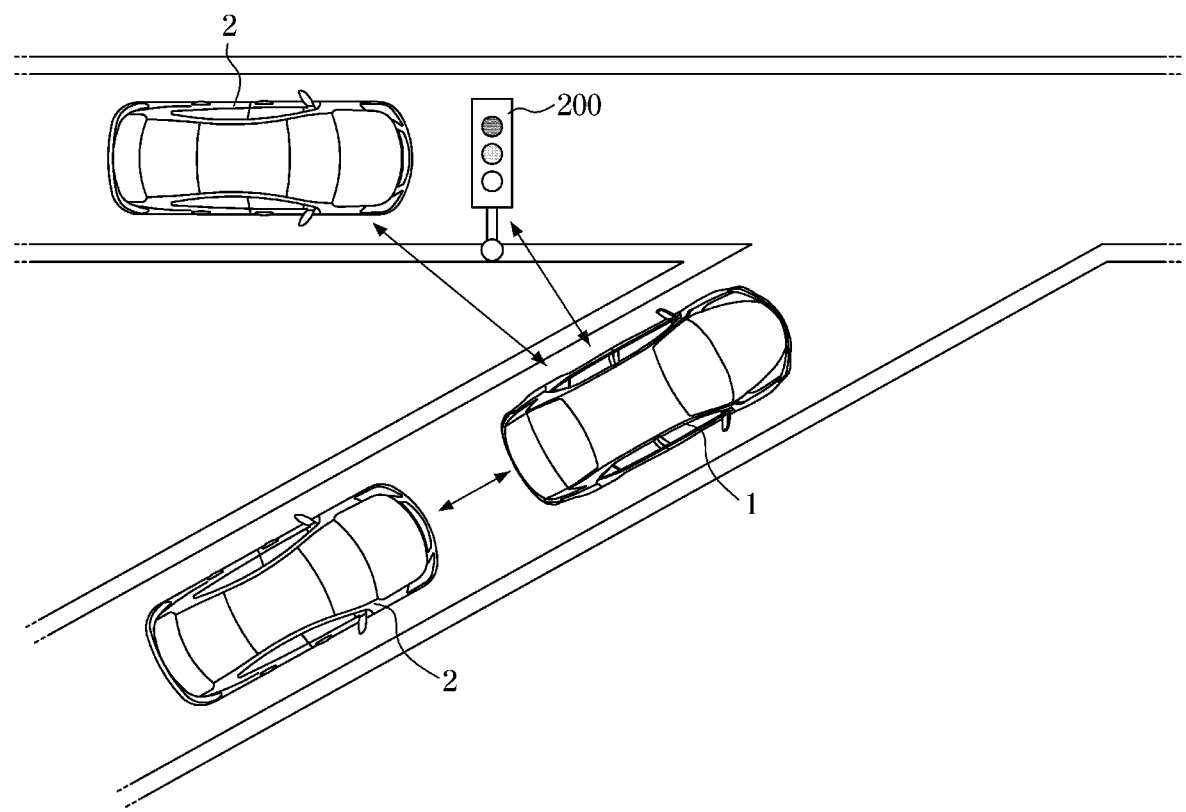
FIG. 1 is a conceptual diagram illustrating a vehicle control system according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refers both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

Examples of ADASs mounted on vehicles include a forward collision avoidance (FCA) system, an autonomous emergency brake (AEB) system, a driver attention warning (DAW) system, and the like. Such a system provides a collision avoidance and warning system that identifies a collision risk with an object in a travelling situation of a vehicle and performs collision avoidance and warning through emergency braking in a collision situation.

However, in the conventional ADAS, when a driver inputs a left turn and/or a right turn signal of a vehicle with a multi-function switch, a rear image is displayed based on a rear camera in the corresponding direction, and there is no way of acquiring a rear image without the driver separately manipulating the multi-function switch. In addition, even when the multi-function switch is manipulated, there is a difficulty in identifying a vehicle approaching from the left on a right turn merging road.

Accordingly, in the conventional ADAS, when vehicles travel and enter a merging road, such as a highway or other roads, a difference in heading direction between a travelling vehicle and an entering vehicle causes a difficulty in identifying a vehicle that merges on the road with a side mirror of the vehicle. Accordingly, the driver needs to separately adjust the side mirror or lower the vehicle window to check the vehicle approaching from the rear.

A vehicle according to an embodiment of the disclosure and a method of controlling the same are provided to solve limitations in the art. However, the disclosure is not limited thereto.

FIG. 1 is a conceptual diagram illustrating a vehicle control system according to an embodiment.

Referring to FIG. 1, the vehicle control system may include, for example, a vehicle 1, a nearby vehicle 2, and an infrastructure 200.

The vehicle 1 refers to a transportation device capable of traveling on a road or track. For the sake of convenience in description, the following description will be made in relation that the vehicle 1 is a four-wheeled vehicle as an example. However, the embodiment of the vehicle 1 is not limited thereto. For example, the vehicle 1 may also include a two-wheeled vehicle, a three-wheeled vehicle, a movable construction machine, a bicycle, or a motorized bicycle. Meanwhile, in the following description, the nearby vehicle 2 is also illustrated as a four-wheeled vehicle. However, the disclosure is not limited thereto.

The nearby vehicle 2 may refer to a nearby vehicle that is not a host vehicle but a vehicle existing in the vicinity of the vehicle 1. More specifically, the nearby vehicle 2 may refer to a vehicle existing within a predetermined distance from the vehicle 1. Here, the predetermined distance may refer to, for example, a range in which smooth communication is performable according to an internal communication module between the vehicle 1 and the nearby vehicle 2.

The infrastructure 200 may be, for example, a traffic infrastructure and/or device for securing traffic safety or smoothing the flow of traffic by indicating signals, such as proceeding and/or stopping, on a track or road of the vehicle 1 or the nearby vehicles 2. In more detail, the infrastructure 200 may refer to a server that transmits traffic information according to a traffic information request of the vehicle 1 through communication with the vehicle 1 or a traffic light itself. However, the disclosure is not limited thereto.

That is, the infrastructure 200 may be a part that transmits current traffic information to the vehicle 1 according to a traffic information request signal of the vehicle 1, in which the traffic information may refer to a signal of a traffic light and/or surrounding accident status, etc. Accordingly, the vehicle 1 may serve to acquire a traffic signal existing within a predetermined distance of the vehicle 1 and/or surrounding accident status based on the traffic information received from the infrastructure 200, and control the vehicle 1 based on the acquired traffic signal and/or surrounding accident status.

The vehicle 1, the nearby vehicle 2, and the infrastructure 200 may be interconnected by a network. The network refers to a wired and wireless connection structure in which information exchange is performable between each node, such as a terminal and a server, and examples of the network may include a 3rd Generation Partnership Project (3GPP) network, a Long Term Evolution (LTE) network, a 5G network, a World Interoperability for Microwave Access (WIMAX) network, Internet, Local Area Network (LAN), a Wireless LAN, a Wide Area Network (WAN), a Personal Area Network (PAN), a Ultra-Wide Band (UWB) network, a Bluetooth network, a Bluetooth Low Energy (BLE), a Near Field Communication (NFC), a satellite broadcasting network, an analog broadcasting network, a Digital Multimedia Broadcasting (DMB) network, etc., but the disclosure is not limited thereto.

In addition, the vehicle 1 may perform vehicle to everything (V2X) communication. Accordingly, the vehicle 1 and the nearby vehicle 2 may transmit/receive information between each other. V2X communication may refer to communication between the vehicles 1 and 2 and between the vehicle 1 and the infrastructure 200, and may refer to 5.9 GHz WAVE communication, which is an IEEE communication standard. However, the disclosure is not limited thereto. Accordingly, the existing V2X communication and/or LTE V2X communication, or V2X communication to be developed in the future may be applied to the disclosure.

V2X communication may implement communication of up to 1 km even in an environment in which the vehicle 1 is traveling at a velocity of 200 km/h, and have a delay time less than 100 msec that is a time required to transmit a message.

The vehicle 1 may perform V2X communication to acquire information according to an agent that performs communication. In more detail, the vehicle 1 may identify information about the nearby vehicle 2 through communication with the nearby vehicle 2, and the information about the nearby vehicle 2 may include, for example, the position, velocity, multi-function switch manipulation information, steering wheel steering information and the like of the nearby vehicle 2. In addition, the vehicle 1 may acquire traffic infrastructure information including traffic lights existing in front of the vehicle 1 and/or in front of the nearby vehicles 2 through communication with the infrastructure 200.

The vehicle control system according to an embodiment of the disclosure may include controlling, by the vehicle 1, a side mirror of the vehicle 1 at a merging point based on communication between the vehicle 1 and the nearby vehicle 2 such that the driver easily secures the position of a nearby vehicle 2 approaching from the left rear side and/or right rear side of the vehicle 1. In addition, the vehicle control system may include determining whether to activate an automatic mirror control of the vehicle 1 based on communication with the infrastructure 200 of the vehicle 1 to provide enhanced efficiency and stable reliability.

Figure 2:
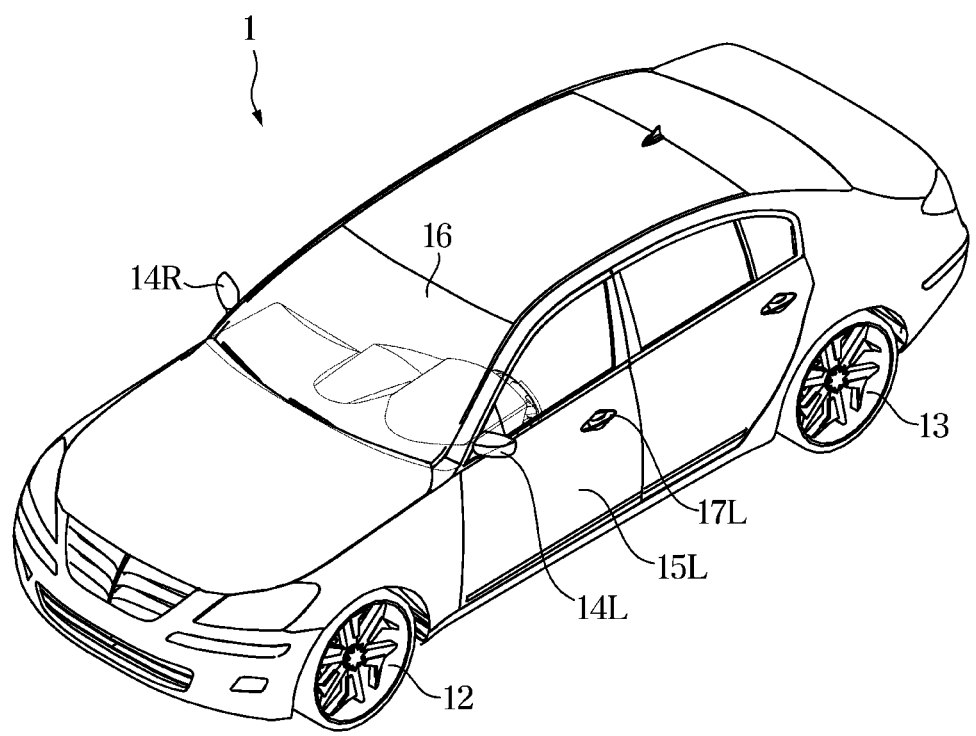
FIG. 2 is a conceptual diagram for describing an exterior of a vehicle according to an embodiment.

FIG. 2 is a conceptual diagram for describing an exterior of a vehicle according to an embodiment.

Referring to FIG. 2, the exterior of the vehicle 1 according to the embodiment may include wheels 12 and 13 for moving the vehicle 1, a left door 15L for shielding the inside of the vehicle 1 from the outside, a front glass 16 for providing a user inside the vehicle 1 with a front view of the vehicle 1, and side mirrors 14L and 14R for providing the user with a rear view of the vehicle 1.

The wheels 12 and 13 include a front wheel 12 provided at the front of the vehicle 1 and a rear wheel 13 provided at the rear of the vehicle 1. A driving device (not shown) provided inside the vehicle 1 may provide the front wheel 12 or the rear wheel 13 with a rotational force for the vehicle 1 to move forward or backward. Such a driving device may be implemented using an engine that generates a rotational force by burning fossil fuel, or a motor that generates a rotational force by receiving power from a capacitor.

The doors 15L and 15R (see FIG. 3) are rotatably provided on the left and right sides of the vehicle 1 such that the user or the passenger may enter the vehicle 1 when the doors 15L are 15R are opened, and the inside of the vehicle 1 is shielded from the outside when the doors 15L and 15R are closed. In addition, a handle 17L for opening and closing the door 15L or 15R (see FIG. 3) may be provided on the outer portion of the vehicle 1. The handle 17L may be provided with an antenna (not shown) capable of transmitting a communication signal. Although the handle 17L provided on the side of the driver's seat is illustrated on the drawing, an antenna (not shown) for transmitting a communication signal may also be mounted on the handle (not shown) on the side of the passenger seat. That is, an antenna (not shown) may be mounted on at least one of the left handle 17L or a right handle (not shown). In addition, an antenna (not shown) capable of transmitting/receiving communication signals may be mounted on various areas inside the vehicle 1.

The front glass 16 is provided on the front upper side of the vehicle 1 such that the driver inside the vehicle 1 may obtain visual information of the front of the vehicle 1, and may also be referred to as a windshield glass.

In addition, the side mirrors 14L and 14R include a left side mirror 14L provided on the left side of the vehicle 1 and a right side mirror 14R provided on the right side of the vehicle 1 such that the user inside the vehicle 1 obtains visual information of sides and a rear of the vehicle.

In addition, the vehicle 1 may include a sensing device including a proximity sensor for detecting an obstacle or nearby vehicle 2 on a rear or lateral sides of the vehicle 1, a rain sensor for detecting rainfall and the amount of rainfall, a camera, a radar sensor, a light detection and ranging (LiDAR) sensor, and the like. However, the disclosure is not limited thereto, and may further include an internal camera, a weight detection sensor, and the like capable of identifying an occupant in the vehicle 1.

Meanwhile, the proximity sensor may transmit a detection signal at the lateral side or at the rear of the vehicle 1, and receive a reflection signal reflected from an obstacle, such as the nearby vehicle 2. Based on the waveform of the received reflection signal, the presence or absence of an obstacle on the lateral side or the rear of the vehicle 1 may be sensed and the position of the obstacle may be detected. An example of such a proximity sensor may use a method of transmitting ultrasound waves or infrared rays to an obstacle and detecting a distance to the obstacle using the ultrasound waves or infrared rays reflected from the obstacle. For example, the proximity sensor may include at least one of a radar sensor or a LiDAR sensor, but the disclosure is not limited thereto.

Figure 3:
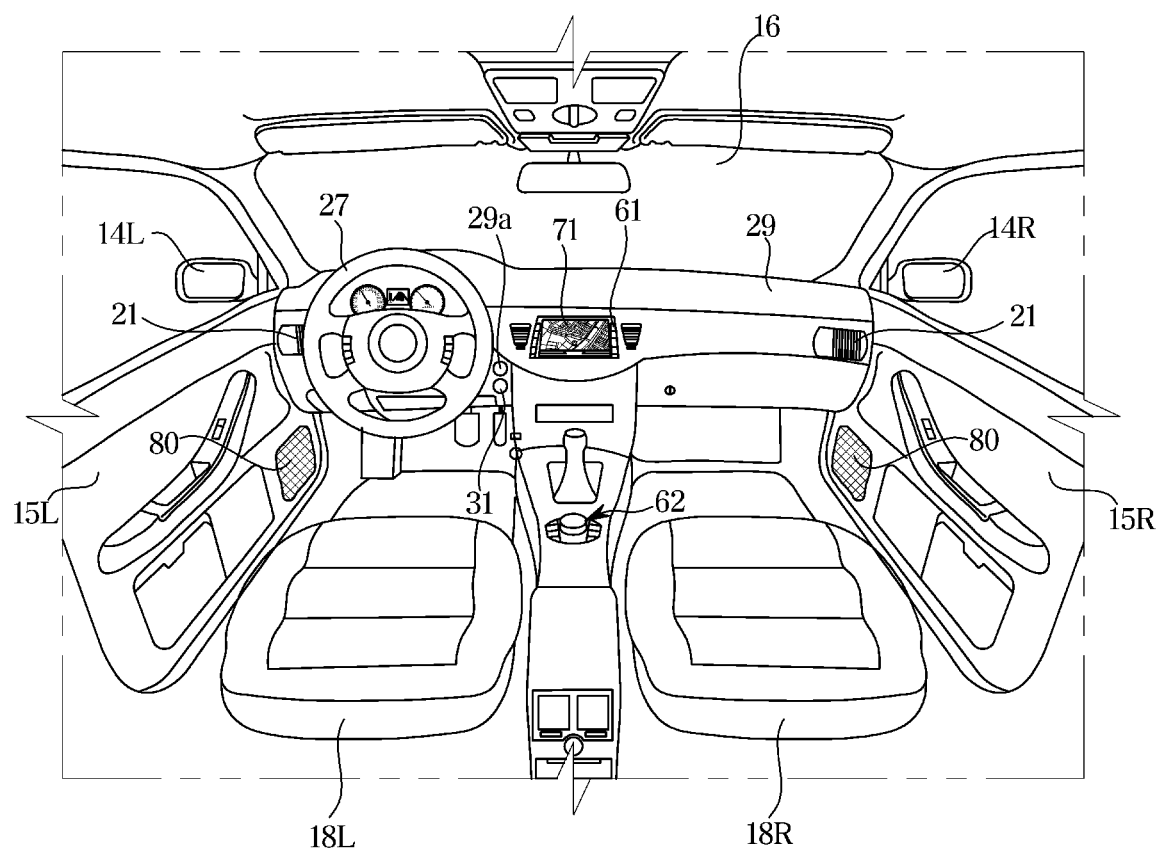
FIG. 3 is a conceptual diagram for describing an interior of a vehicle according to an embodiment.

FIG. 3 is a conceptual diagram for describing an interior of a vehicle according to an embodiment.

Referring to FIG. 3, an Audio, Video, Navigation (AVN) display 71 and an AVN inputter 61 may be provided in a central area of a dashboard 29. The AVN display 71 may selectively display at least one of an audio screen, a video screen, or a navigation screen, and may also display various control screens related to the vehicle 1 or screens related to additional functions. Accordingly, the AVN display 71 may be provided with a navigation device that is embedded therein or integrated therewith.

The AVN display 71 may be implemented as a liquid crystal display (LCD), a light emitting diode (LED), a plasma display panel (PDP), an organic light emitting diode (OLED), a cathode ray tube (CRT), or the like.

The AVN inputter 61 may be implemented as a hard key type in an area adjacent to the AVN display 71. When the AVN display 71 is implemented as a touch screen type, the AVN inputter 61 may be provided on a front surface of the AVN display 71 in the form of a touch panel.

In addition, a center inputter 62 of a jog shuttle type may be provided between a driver's seat 18L and a passenger seat 18R. The user may input a control command by turning or pressing the center inputter 62 or pushing the center inputter 62 in an upper, lower, left, or right direction. The driver may input an on/off control command of an automatic mirror control function of the vehicle 1 through the center inputter 62. However, the disclosure is not limited thereto. For example, the driver may input a control command through a switch provided inside the vehicle 1 and/or other various types of input devices.

The vehicle 1 may be provided with a sound outputter 80 for outputting sound. The sound outputter 80 may include a speaker. The sound outputter 80 may output sound required to perform an audio function, a video function, a navigation function, and other additional functions.

For example, the sound outputter 80 may be provided on each of the left door 15L and the right door 15R, and as required, may be provided on other areas, such as a door of the rear seat, the dashboard 29, and the like.

The dashboard 29 may be provided at a side facing the driver's seat 18L with a steering wheel 27, and may be provided at an area adjacent to the steering wheel 27 with a key groove 29a into which a remote control device (not shown) is inserted. When the remote control device is inserted into the key groove 29a, or an authentication between a remote control device and the vehicle 1 is completed via a wireless communication network, the vehicle 1 is connected with the remote control device.

In addition, the dashboard 26 may be provided with an ignition button 31 for controlling on/off of the ignition of the vehicle 1. In addition, the vehicle 1 may be provided with an air conditioning device. In more detail, the air conditioning device may adjust the temperature, humidity, air cleanliness, and air flow inside the vehicle 1 to keep the interior of the vehicle comfortable. The air conditioning device may include at least one outlet 21 for discharging air. A user, such as a driver, may control the air conditioning device of the vehicle 1 using the center inputter 62. However, the disclosure is not limited thereto.

Figure 4:
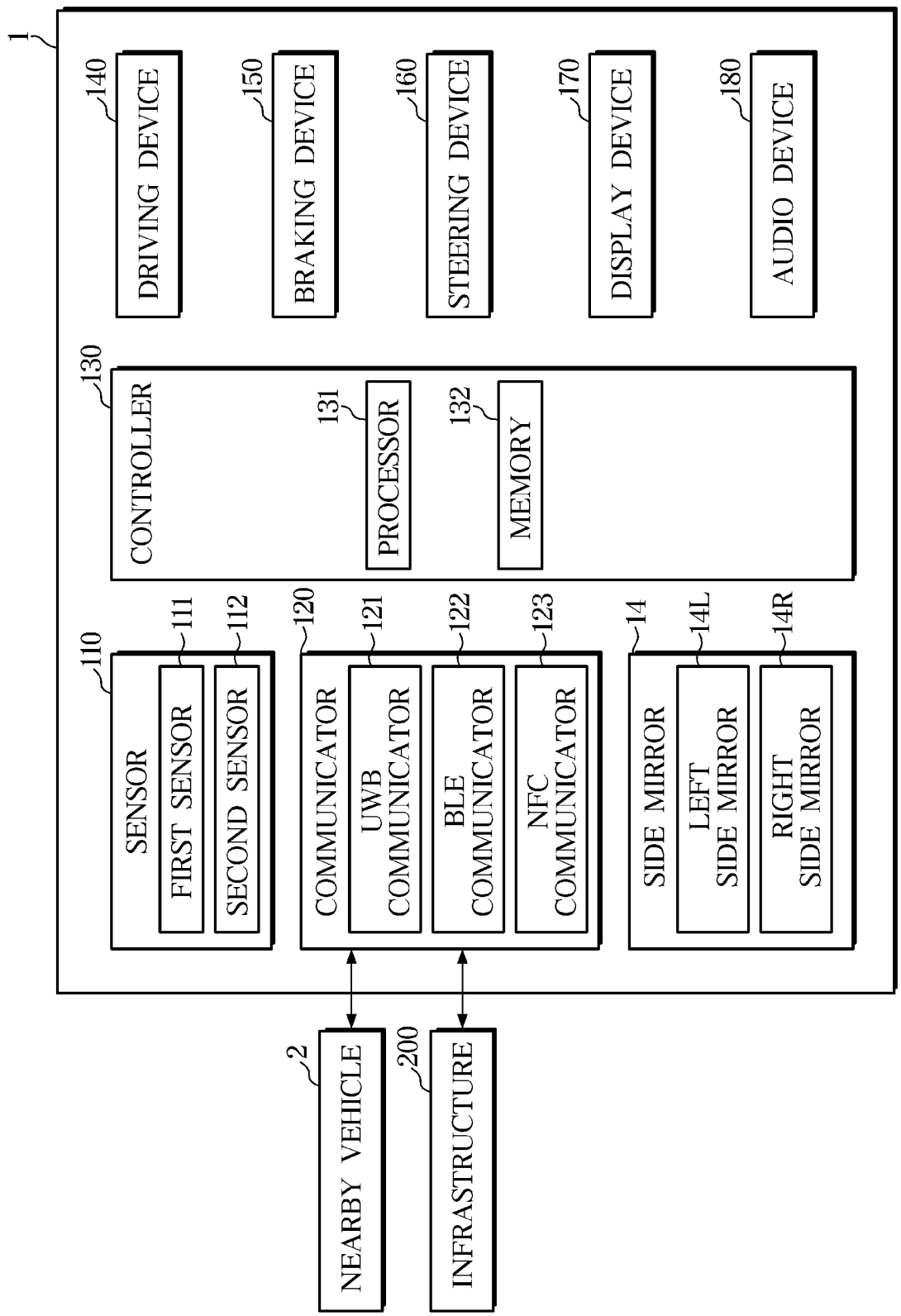
FIG. 4 is a block diagram illustrating a configuration of a vehicle control system according to an embodiment.

FIG. 4 is a block diagram illustrating a configuration of a vehicle control system according to an embodiment.

Referring to FIG. 4, the vehicle 1 according to the embodiment may include a side mirror 14, a sensor 110, a communicator 120, a controller 130, a driving device 140, a braking device 150, a steering device 160, a display device 170, and/or an audio device 180. Such components may communicate with each other via a vehicle communication network (NT). For example, electric devices 14, 110, 120, 130, 140, 150, 160, 170, and 180 included in the vehicle 1 may exchange data therebetween through Ethernet, Media Oriented Systems Transport (MOST), Flexray, Controller Area Network (CAN), Local Interconnect Network (LIN), and the like.

The sensor 110 may include a first sensor 11 and a second sensor 112. In more detail, the first sensor in may obtain, for example, surrounding state data of the vehicle 1, and the second sensor may obtain, for example, internal state data of the vehicle 1. Hereinafter, a camera, a radar sensor, and a LiDAR sensor included in the first sensor in will be described in more detail.

For example, the first sensor 111 may include a camera, a radar sensor, and a LiDAR sensor. For example, the camera may be installed inside and/or outside the vehicle 1 to face, for example, forward and/or left/right wards, and/or rearward, but the disclosure is not limited to a position. Therefore, both the radar sensor and the LiDAR sensor may be installed regardless of the position and transmit acquired surrounding data of the vehicle 1.

The first sensor 111 and the controller 130 may provide a lane departure warning (LDW), a lane keeping assist (LKA), a high beam assist (HBA), an autonomous emergency braking (AEB), a traffic sign recognition (TSR), an adaptive cruise control (ACC), a blind spot detection (BSD), and the like. However, the disclosure is not limited thereto.

According to another embodiment, the camera, the radar sensor, the LiDAR sensor, and the controller 130 may be provided separately from each other. For example, the controller 130 may be installed in a housing separated from a housing of a camera, a housing of a radar sensor, and a housing of the LiDAR sensor. The controller 130 may exchange data with the camera, the radar sensor, or a LiDAR sensor through a wide bandwidth network.

The camera may include a plurality of lenses and an image sensor. The image sensor may include a plurality of photodiodes for converting light into electrical signals, and the plurality of photodiodes may be arranged in a two-dimensional matrix.

The camera may photograph the surroundings of the vehicle 1 and acquire surrounding image data of the vehicle 1. The surrounding image data of the vehicle 1 may include information about the nearby vehicles 2 or pedestrians or cyclists or lane lines (markers for distinguishing lanes) located in the surroundings of the vehicle 1. In addition, the surrounding image data of the vehicle 1 may include information about a free space in which the vehicle 1 may travel.

The camera may be electrically connected to the controller 130. For example, the camera may be connected to the controller 130 through a vehicle communication network NT or through a hard wire. The camera may transmit surrounding image data of the vehicle 1 to the controller 130.

The controller 130 may process image data received from the camera, and from the processed image data, identify a nearby vehicle 2 or a pedestrian or a cyclist or a lane line (a marker that distinguishes a lane) or a free space located in the surroundings of the vehicle 1. In particular, the controller 130 may identify the color and type of a lane line (a marker for discriminating a lane) of the vehicle 1 based on the processing of the image data. Accordingly, the controller 130 may identify a front merging road of the vehicle 1 based on the processing of the image data.

The radar sensor may be installed, for example, on a grille or bumper of the vehicle 1. However, the disclosure is not limited thereto.

The radar sensor may include a transmission antenna (or a transmission antenna array) that radiates transmission radio waves forward and/or rearward and/or sideward of the vehicle 1 and a reception antenna (or a reception antenna array) that receives reflection radio waves reflected from an object. The radar sensor may acquire radar data from the transmission radio waves transmitted by the transmission antenna and the reflection radio waves received by the reception antenna. The radar data may include the relative position and relative velocity of the nearby vehicle 2 or a pedestrian or a cyclist located in the surroundings of the vehicle 1. The radar sensor may calculate the relative distance to the obstacle based on the phase difference (or time difference) between the transmission radio waves and the reflection radio waves, and calculate the relative velocity of the obstacle based on the frequency difference between the transmission radio waves and the reflected radio waves.

The radar sensor may be connected to the controller 130 through, for example, a vehicle communication network (NT) or a hard wire or a printed circuit board. The radar sensor may transmit radar data to the controller 130.

The controller 130 may process the radar data received from the radar sensor, and identify the relative position and relative velocity of the nearby vehicle 2 or the pedestrian or the cyclist located in the surroundings of the vehicle 1 from the radar data.

The LiDAR sensor may have a field of view in all directions in the surroundings of the vehicle 1. The LiDAR sensor may be installed, for example, on the roof of the vehicle 1.

A LiDAR sensor may include a light source (e.g., a light emitting diode or a light emitting diode array or a laser diode or laser diode array) that emits light (e.g., infrared light) and a light receiver (e.g., a photodiode or a photodiode array) that receives light reflected from an object. In addition, as needed, the LiDAR sensor may further include a driving device for rotating the light source and the light receiver. During rotation, the LiDAR sensor may emit light and receive light reflected from the object so that LiDAR data is received. The LiDAR data may include the relative position and relative velocity of a nearby vehicle 2 or a pedestrian or a cyclist in the surroundings of the vehicle 1.

The LiDAR sensor may be connected to the controller 130 through, for example, a vehicle communication network (NT) or a hard wire or a printed circuit board. The LiDAR sensor may transmit LiDAR data to the controller 130.

The second sensor 112 may acquire internal state data of the vehicle 1. Here, the internal state data may include, for example, the position and/or height of the driver's seat in the vehicle 1, image data of the driver of the vehicle 1, the horizontal and/or vertical angle of the side mirror, side mirror manipulation information of the vehicle, and the like. For example, the second sensor 112 may include a weight sensor for detecting the weight of a seat 18 of the vehicle 1, a motion detection sensor for detecting a movement inside the vehicle 1, a Hall sensor for detecting the position of the seat 18 of the vehicle 1, and the like. Meanwhile, sensors included in the above-described second sensor 112 may be replaced with other sensors performing the same function.

In addition, the second sensor 112 may include a global positioning system (GPS) sensor that acquires position data of the vehicle 1. Accordingly, the controller 130 may identify whether the vehicle 1 enters a highway and/or may identify a merging point in front of the vehicle 1 based on the position of the vehicle 1 and navigation data of the vehicle 1 obtained from the second sensor 112. However, the disclosure is not limited thereto. In addition, the second sensor 112 may include a sensor for obtaining information about the heading direction of the vehicle 1, the velocity of the vehicle 1, and the like.

The communicator 120 may include at least one of an ultra-wideband (UWB) communicator 121 for UWB communication, a BLE communicator 122 for low-power Bluetooth network communication, or a near field communication (NFC) communicator 123 for NFC.

UWB communication is a wireless communication method that transmits/receives data by spreading a signal having an ultra-wideband frequency in the range of 3.1 GHz to 10.6 GHz, and according to UWB communication, not only data is transmitted/received but also, the position of a communication medium (e.g., a nearby vehicle 2 and/or infrastructure 200) is detected based on communication data (transmission signals and reception signals).

Meanwhile, when the communicator 120 includes at least one of the UWB communicator 121, the BLE communicator 122, or the NFC communicator 123, the communicator 120 may include an antenna (not shown) corresponding thereto. That is, when the communicator 120 includes only the UWB communicator 121, the communicator 120 may include an antenna (not shown) suitable for UWB communication. However, the disclosure is not limited thereto.

According to another embodiment, the communicator 120 may include a Low Frequency (LF) communicator (not shown) for transmitting and receiving a LF signal with the nearby vehicle 2 and/or the infrastructure 200, and a radio frequency (RF) communicator (not shown) for transmitting and receiving a RF signal with the nearby vehicle 2 and/or the infrastructure 200. Here, the LF signal may be a radio signal having a low frequency band of 120 kHz or more and 135 kHz or less. In addition, a RF signal may be a radio signal having an ultra-high frequency (UHF) band of 315 MHz or more and 433 MHz or less.

In addition, the communicator 120 may include a memory for storing a program and data for performing modulation/demodulation, and a processor for performing modulation/demodulation on a communication signal according to the program and data stored in the memory. Accordingly, the communicator 120 may, in order to transmit/receive a control signal related to a procedure for checking unique identifier (ID) information or a control signal related to the vehicle 1, transmit and receive a LF signal, a RF signal, an ultra-wideband signal, and the like to and from the nearby vehicle 2 and/or the infrastructure 200.

The communicator 120 may transmit a search signal that is periodically transmitted. Here, the search signal refers to a communication signal transmitted from the vehicle 1 to the surroundings of the vehicle 1 (within a range in which communication is allowable) to determine whether the nearby vehicle 2 and/or the infrastructure 200 is present within a communication coverage from the vehicle 1.

The communicator 120 may, depending on at least one of the UWB communicator 121, the BLE communicator 122, the NFC communicator 123, the LF communicator (not shown), or the RF communicator (not shown) included in the communicator 120, include a communication interface including a communication port for connecting the corresponding communication network to the nearby vehicle 2 and a receiver for receiving a communication signal. In addition, the communicator 120 may further include a communication signal conversion module for demodulating the communication signal received through the communication interface into a control signal under the control of the controller 130. Accordingly, the nearby vehicle 2 may also be provided with a communication interface for communicating with the vehicle 1.

The communicator 120 may receive a search response signal of the nearby vehicle 2 and/or the infrastructure 200 responding to the search signal of the vehicle 1. The search response signal refers to a communication signal transmitted from the nearby vehicle 2 to the vehicle 1 such that the vehicle 1 confirms that the nearby vehicle 2 has received the search signal from the vehicle 1.

As described above, the communicator 120 may transmit the search signal for searching for the nearby vehicle 2 and/or the infrastructure 200 and the search response signal in a different format depending on at least one of the UWB communicator 121, the BLE communicator 122, the NFC communicator 123, the RF communicator (not shown), and the LF communicator (not shown) included in the communicator 120.

Meanwhile, the search signal and the search response signal may have different formats.

Meanwhile, the communicator 120 may include at least one antenna (not shown) to communicate with the nearby vehicle 2 and/or the infrastructure 200 through the antenna. Here, it should be understood that the antenna (not shown) may refer to a receiver included in the communication interface as described above.

In addition, the communicator 120 may transmit a communication signal regarding the nearby vehicle 2 and/or the infrastructure 200 to the controller 130.

Meanwhile, the controller 130 may identify the position of the nearby vehicle 2 and/or the infrastructure 200 based on communication data including the search signal and the search response signal received from the communicator 120.

More specifically, the controller 130 may more accurately identify the position of the remote control device based on the search signal and the search response signal received from each of the communicators 121, 122, and 123, and the like which are included in the communicator 120 and use respective frequency bands.

Meanwhile, it should be understood that the nearby vehicle 2 and/or the infrastructure 200 include a communication interface capable of communicating with the communicator 120 according to the above description.

Figure 5:
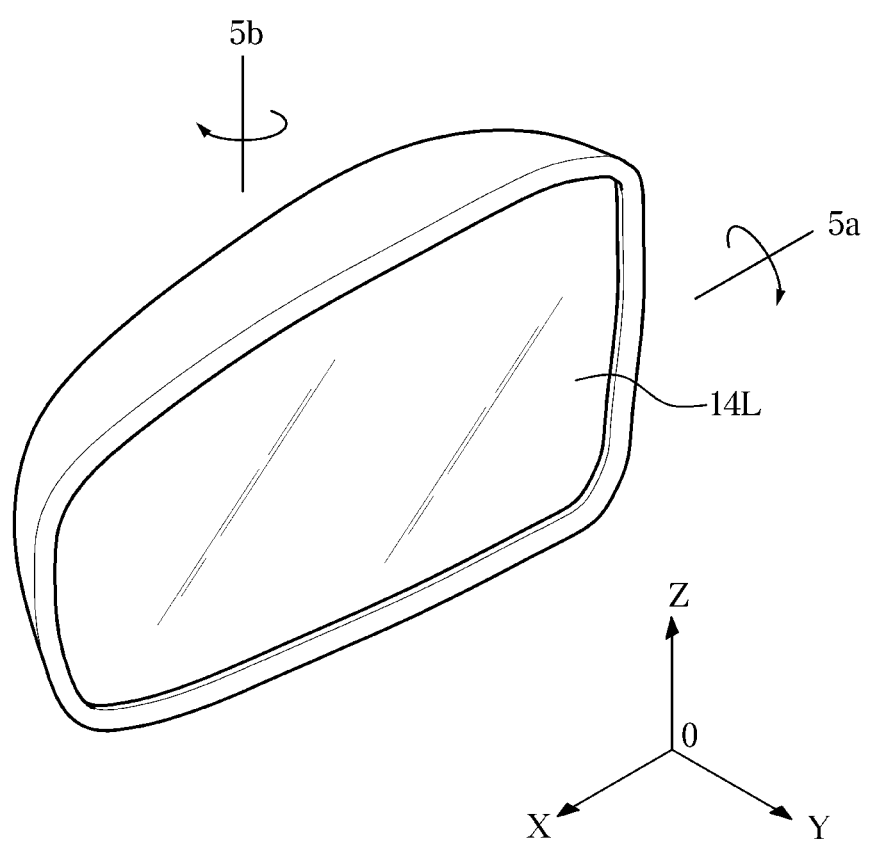
FIG. 5 is a conceptual diagram illustrating driving of a vehicle side mirror according to an embodiment.

FIG. 5 is a conceptual diagram illustrating driving of a side mirror 14 of a vehicle 1 according to an embodiment.

Referring to FIG. 5, for the sake of convenience in description, the following will be described in relation to the left side mirror 14L of the vehicle 1, but it should be understood that the same description may be applied to the right side mirror 14R.

The side mirror 14 may include, for example, an actuator driving unit (not shown) capable of adjusting the angle of the side mirror 14. Accordingly, an angle including a horizontal angle and a vertical angle of the side mirror 14 may be adjusted based on a control signal of the controller 130.

Referring to FIG. 5, the side mirror 14L may control a horizontal angle 5a with respect to the X-axis and may control a vertical angle 5b with respect to the Y-axis according to a control signal of the controller 130. The side mirror 14L may control at least one of the horizontal angle 5a or the vertical angle 5b according to a control signal of the controller 130 to secure a rear view of the driver of the vehicle 1. In addition, the side mirror 14 may receive a control signal for driving at least one of the left side mirror 14L and/or the right side mirror 14R from the controller 130.

Hereinafter, the driving device 140, the braking device 150, the steering device 160, the display device 170, and the audio device 180 of the vehicle 1 will be described in detail and then the controller 130 will be described.

The driving device 140 may be provided to move the vehicle 1 and may include, for example, an engine, an engine management system (EMS), a transmission, and a transmission control unit (TCU). The engine generates power required for the vehicle 1 to travel, and the EMS may control the engine in response to an acceleration intent of a driver through an accelerator pedal or a request of the controller 130. The transmission decelerates the power generated by the engine and transfers the power to the wheels, and the TCU may control the transmission in response to a shift command of the driver through a shift lever and/or a request of the controller 130.

The braking device 150 may be provided to stop the vehicle 1 and may include, for example, a brake caliper and an electronic brake control module (EBCM). The brake caliper may decelerate the vehicle 1 or stop the vehicle 1 using friction with a brake disc, and the EBCM may control the brake caliper in response to a braking intent of a driver through a brake pedal and/or a request of the controller 130. For example, the EBCM may receive a deceleration request including a deceleration from the controller 130 and electrically or hydraulically control the brake caliper to decelerate the vehicle 1 depending on the requested deceleration.

The steering device 160 may include an electronic power steering control module (EPS). The steering device 160 may change the travelling direction of the vehicle 1, and the EPS may assist the operation of the steering device 160 such that the driver easily manipulates the steering wheel in response to a steering intent of the driver through the steering wheel. In addition, the EPS may control the steering device in response to a request from the controller 130. For example, the EPS may receive a steering request including a steering torque from the controller 130 and control the steering device to steer the vehicle 1 depending on the requested steering torque.

The display device 170 may include a cluster, a head-up display, a center fascia monitor, and the like, and may provide the driver with various types of information and entertainment through images and sounds. For example, the display device 170 may provide the driver with travelling information of the vehicle 1, information about a route to a destination, a warning message, and the like. In other words, the display device 170 may be the same as the AVN display 71.

The audio device 180 may include a plurality of speakers and may provide the driver with various types of information and entertainment through sound. For example, the audio device 180 may provide the driver with travelling information of the vehicle 1, information about a route to a destination, a warning message, and the like. In other words, the audio device 180 may be the same as the sound outputter 80.

The controller 130 may include a processor 131 and a memory 132.

The processor 131 may process image data, radar data, and LiDAR data, and output control signals for controlling not only the driving device 140, the braking device 150, the steering device 160, the display device 170, and the audio device 180 but also the sensor 110, the communicator 120, and the side mirror 14. For example, the processor 131 may include an image processor, a digital signal processor (DSP), and/or a micro control unit (MCU).

The processor 131 may identify nearby objects of the vehicle 1 based on processing first sensor data (surrounding state data) obtained from the first sensor 11. More specifically, the processor 131 may identify the nearby vehicle 2 existing in the surroundings of the vehicle 1, and may identify the distance to the identified object and/or the nearby vehicle 2 and the size of the identified object.

The processor 131 may identify the position of the vehicle 1 based on second sensor data (internal state data of the vehicle 1) obtained from the second sensor 112, and based on the identified position of the vehicle 1, receive data of a three dimensional (3D) navigation map of the surroundings of the vehicle 1 from the memory 132. However, the disclosure is not limited thereto. The position of the vehicle 1 may be determined, for example, by the second sensor 112, e.g., a global positioning system (GPS) or other positioning systems.

Hereinafter, for the sake of convenience in description, the surrounding state data of the vehicle 1 obtained from the first sensor 111 will be referred to as first sensor data, and the internal state data of the vehicle 1 obtained from the second sensor 112 will be referred to as second sensor data.

Accordingly, the processor 131 of the vehicle 1 according to an embodiment of the disclosure may identify whether automatic mirror control of the vehicle 1 is performable based on processing first sensor data, second sensor data, and communication signals between the communicator 120, and the nearby vehicle 2 and/or the infrastructure 200.

In more detail, the processor 131 of the vehicle 1 may process the first sensor data, the second sensor data, and communications in response to a mirror function being turned on by the driver of the vehicle 1. Accordingly, the processor 131 may determine whether the vehicle 1 is in a state capable of automatically controlling the side mirror 14.

The processor 131 may identify whether the angle of the side mirror of the vehicle 1 corresponds to a limit angle based on the processing of the second sensor data, and according to the identification, determine whether the vehicle 1 is in a state of being capable of automatically controlling the side mirror 14. In other words, in response to the angle of the side mirror 14 of the vehicle 1 corresponding to the limit angle, it may be determined that the effect obtained by separately controlling the side mirror 14 is insignificant, or that the driver has already adjusted the side mirror 14. Therefore, the identification and determination may prevent the driver from being confused in such a situation.

The processor 131 may identify whether at least one of the camera, the radar sensor, the LiDAR sensor, or the GPS sensor of the vehicle 1 operates normally based on processing of the first sensor data and the second sensor data, and in response to the at least one sensor being normally operated, identify (determine) that the vehicle 1 is in a state capable of performing automatic mirror control. In a case in which the vehicle 1 is incapable of identifying a merging point on the travelling road, the above described identification and determination may prevent malfunction of automatic mirror control.

Accordingly, the first sensor 11 and/or the second sensor 112 may further include a feedback module and/or system for normal operation. However, the disclosure is not limited thereto. Accordingly, the disclosure may employ the processor 131 storing and executing an algorithm for determining a malfunction of a sensor and/or the existing method of detecting a sensor malfunction and/or a technology to be developed in the future.

In addition, the processor 131 may identify a V2X communication state of the vehicle 1 based on processing of the first sensor data and the communication signal, and based on the identified communication state, identify whether automatic mirror control of the vehicle 1 is performable. In more detail, the processor 131 may, when it is determined that communication is not connected between the vehicle 1 and the nearby vehicle 2 based on processing of communication signals, identify automatic mirror control of the vehicle 1 is not performable because the processor 131 is incapable of receiving vehicle information of the nearby vehicle 2 when the communication between the vehicle 1 and the nearby vehicle 2 is not connected and thus has a difficulty in performing automatic mirror control. However, the disclosure is not limited thereto.

According to another embodiment, the processor 131 may identify the nearby vehicle 2 based on processing of the first sensor data, and in response to the position and state (velocity, etc.) of the nearby vehicle 2 being identified, identify that the vehicle 1 is in a state capable of automatic mirror control based on the identified nearby vehicle 2.

The processor 131 may, in response to the vehicle 1 being identified as being capable of automatic mirror control based on the processing of the first sensor data, the second sensor data, and the communication signals, identify an object that is a nearby vehicle 2 expected to cross the vehicle 1 among at least one nearby vehicle 2 based on processing of communication signals. In other words, the processor 131 may identify position and velocity information of at least one nearby vehicle 2 based on processing of communication with the at least one nearby vehicle 2, and may expect that a nearby vehicle 2 is likely to cross the vehicle 1 based on the identified position and velocity information. Here, the crossing may refer to a collision, and may also refer to a situation in which no collision occurs but the heading directions are the same, so that the driver feels anxiety.

Accordingly, the processor 131 may identify an object that is a nearby vehicle 2 expected to cross the vehicle 1 among the at least one nearby vehicle 2.

Meanwhile, the processor 131 may, in response to identifying a nearby vehicle 2 expected to cross the vehicle 1 from the at least one nearby vehicle 2 as an object, identify the velocity of the object based on communication with the object and/or the first sensor data. Accordingly, the processor 131 may, in response to the velocity of the identified object being higher than a predetermined velocity, generate a control signal for controlling the display device 170 and/or the audio device 180 of the vehicle 1 to output a warning message and/or a sound. However, the disclosure is not limited thereto. In addition, various driver warning methods may be applied to the disclosure. For example, the driver may be warned through vibration of the steering wheel 27 of the vehicle 1 and/or vibration of the seat 18.

The processor 131 may identify an angle between the heading direction of the identified object and the heading direction of the vehicle 1. Accordingly, the processor 131 may generate a control signal for controlling the angle of the side mirror 14 of the vehicle 1 based on the identified angle between the heading direction of the vehicle 1 and the heading direction of the object.

Figure 6:
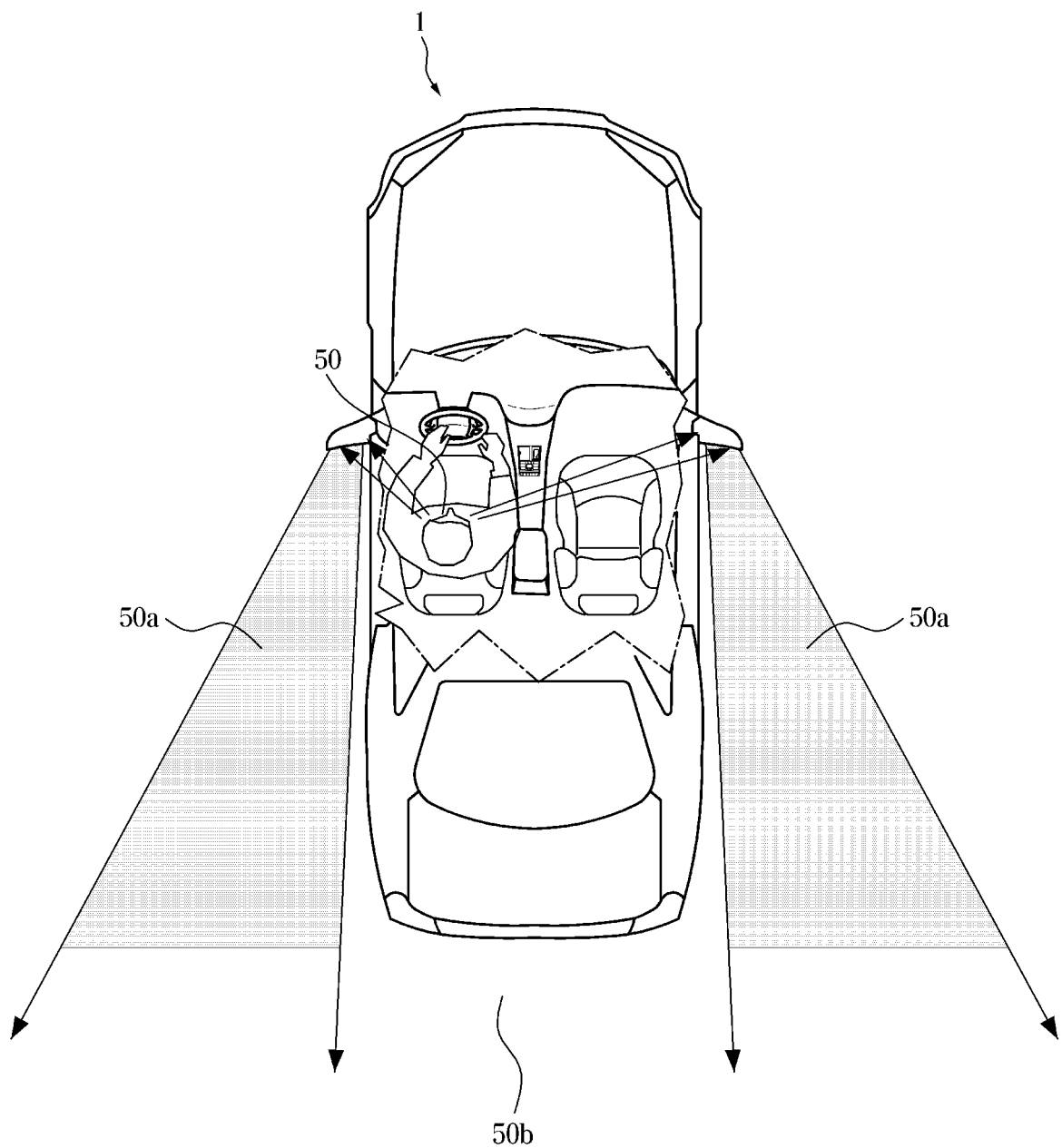
FIG. 6 is a conceptual diagram illustrating a visible area of a driver of a vehicle according to an embodiment.

FIG. 6 is a conceptual diagram illustrating a visible area of a driver of the vehicle according to the embodiment.

Referring to FIG. 6, the processor 131 may identify the height and/or the lateral position and/or the longitudinal position of the eyes of the driver of the vehicle 1 based on processing of the second sensor data. Accordingly, the processor 131 may obtain a viewpoint 50 of the driver based on at least one of the identified height and/or lateral position and/or longitudinal position of the eyes of the driver of the vehicle 1, and based on the viewpoint 50, identify a visible area 50a of the driver.

On the other hand, the visible area 50a and the non-visible area 50b of the driver of the vehicle 1 may be provided such that when the vehicle 1 travels on a general road, the nearby vehicle 2 exists in the visible area 50a according to an angle of the side mirror 14 that is preset by the driver, which allows the driver to easily identify the position of the nearby vehicle 2.

However, when the vehicle 1 is traveling on a merging road through a right turn and/or a merging road through a left turn, there is a case in which the difference between the heading angle of the vehicle 1 and the travelling angle of the nearby vehicle 2 becomes greater than the angle of the visible area 50a, in which case, the nearby vehicle 2 is caused to exist in the non-visible area 50b, and the driver has a risk of an accident or inconvenience at all times.

In order to solve such a limitation, the processor 131 may identify the viewpoint 50 of the driver of the vehicle 1 based on processing of the second sensor data, and based on the viewpoint 50 of the driver and the angle of the side mirror 14, calculate the visible area 50a of the vehicle 1.

In addition, the processor 131 may, based on the angular difference between the heading direction of the vehicle 1 and the heading direction of the nearby vehicle 2, generate a control signal for controlling the side mirror 14 such that the nearby vehicle 2 is included in the visible area 50a of the driver, and transmit the generated control signal to the side mirror 14. However, the disclosure is not limited thereto. According to another embodiment, the processor 131 may receive a basic angle value from the memory 132 or from the driver, and control the mirror angle control by the corresponding numerical value.

On the other hand, the processor 131 may, in response to the identification of an object that is expected to cross the vehicle 1 among the nearby vehicles 2, generate a control signal for the communicator 120 to perform communication with the infrastructure 200 existing in front of the identified object. Accordingly, the processor 131 may, based on processing the communication with the infrastructure 200, obtain a traffic signal of the infrastructure 200 in front of the object and re-identify the object based on the obtained traffic signal. Here, re-identification may refer to changing (re-assigning) the identified object or deleting the identified object.

On the other hand, the re-identification may refer to identifying a new object by the processor 131 when there is no object expected to cross the vehicle 1 among the nearby vehicles 2, in response to the traffic signal being changed from red to green based on the communication with the infrastructure 200. In other words, it is not that the processor 131 performs communication with the infrastructure 200 in response to an object being identified, but that the processor attempts and achieves communication with the infrastructure 200 independent of identifying an object.

More specifically, the processor 131 may, upon obtaining a traffic signal of the infrastructure 200 in front of the object corresponding to a "Do not proceed" (red) sign based on processing of a communication with the infrastructure 200, deactivate the automatic mirror control function of the vehicle 1. This is a case in which the vehicle 1 may proceed with joining the road without an obstruction due to the object being unlikely to proceed. Similarly, in a case in which a traffic signal corresponding to a "Proceed" (green) sign based on processing of a communication with the infrastructure 200, the processor 131 may maintain the automatic mirror control function.

In addition, the processor 131 may, in response to the traffic signal of the infrastructure 200 changing from green to red, delete the identified object to deactivate the automatic mirror control function. As another embodiment, in response to the traffic signal of the infrastructure 200 changing from red to green, the processor 131 may identify an object, which has not been identified, as an object through re-identification.

In addition, the processor 131 may, in response to determining that a nearby vehicle in front of the vehicle 1 joins a road which the vehicle 1 needs to join through a left and/or right turn, while the traffic signal at the intersection of the infrastructure 200 changes, identify an object, which has not been identified, as an object through re-identification. However, the disclosure is not limited thereto.

The processor 131 may, in response to an object being identified, generate a control signal for the display device 170 and/or the audio device 180 of the vehicle 1 to transmit, to the driver, a message informing that the object has been identified. This is to prevent the system from failing to alert the driver to a vehicle that approaches from a far distance to join a road, that is, a failure occurring when a warning is transmitted to the driver only when there is a small difference in velocity or a small distance between the vehicle and the nearby vehicle as in the conventional rear collision warning system.

Meanwhile, the processor 131 may control the side mirror 14 of the vehicle 1 based on an angle between the heading direction of the identified object and the heading direction of the vehicle 1. More specifically, the processor 131 may generate a control signal for controlling only the left side mirror 14L when the vehicle 1 joins a road through a right turn, and may generate a control signal for controlling only the right side mirror 14R when the vehicle 1 joins a road through a left turn.

Meanwhile, the processor 131 may, upon identification of the vehicle 1 joining that is identified based on the processing of the first sensor data and/or navigation data, generate a control signal for changing the angle of the side mirror 14 to the previous angle of the side mirror 14 before the control of the angle of the side mirror 14. In addition, the processor 131 may, when the angle of the side mirror 14 is not changed even after generation of the control signal to change the angle to the previous angle before the angle control, and even after a preset number of times of attempts to change the angle, generate a control signal for the display device 170 and/or the audio device 180 to output a warning message and/or sound.

The processor 131 may, upon identifying an object, transmit a warning message indicating the possibility of emergency braking of the vehicle 1 to the nearby vehicle 2 existing behind the vehicle 1 through communication. However, the disclosure is not limited thereto, and according to another embodiment, the processor 131 may generate a control signal to display the emergency light of the vehicle 1.

Meanwhile, the processor 131 may deactivate the automatic mirror control of the vehicle 1 according to whether the ADAS of the vehicle 1 is operated. More specifically, the processor 131 may, based on a manipulation control command of the side mirror 14 of the vehicle 1 being received by the driver, deactivate the automatic mirror control of the vehicle 1. This may be to prevent confusion of the driver by assigning priority of control of the side mirror 14.

In addition, the processor 131 may, in response to the collision warning system operating in the vehicle 1, deactivate the automatic mirror control of the vehicle 1. This is a case identified according to the characteristics of the collision warning system as a situation in which a collision between the vehicle 1 and nearby obstacles is expected to occur, that is, an emergency situation, and thus the automatic mirror control may be deactivated. However, the disclosure is not limited thereto.

On the other hand, the processor 131 may, when controlling the angle of the side mirror 14 of the vehicle 1 based on the difference in the heading direction angle between the vehicle 1 and the nearby vehicle 2, in response to the identified control angle of the side mirror 14 being greater than a limit angle (a threshold) of the side mirror 14, deactivate the automatic mirror control of the vehicle 1. Here, the limit angle (the threshold) may refer to a difference between the current angle of the side mirror of the vehicle 1 and the angle changeable maximally. That is, the processor 131 may, in response to the control angle being greater than the limit angle of the side mirror 14, when controlling the side mirror 14 of the vehicle 1 based on the identified control angle, deactivate the automatic mirror control of the vehicle 1. However, the disclosure is not limited thereto.

The memory 132 may store map information and various types of information related to navigation. Among pieces of information received from the communicator 120, required information may be stored in a memory in the form of a database. For example, the memory 132 may store data of a 3D navigation map and/or a user setting value for side mirror angle control.

The memory 132 may store a program for performing the above-described operation and an operation to be described below, and the processor 131 may execute the stored program. In more detail, the memory 132 may memorize the first sensor data and/or the second sensor data obtained by the sensor 110 and/or the communication signal and/or the communication data obtained by the communicator 120, and may memorize results of processing the first sensor data and/or the second sensor data and/or the communication signal.

When the memory 132 and the processor 131 are provided in plural, the memory 132 and the processor 131 may be integrated into a single chip, or may be provided in physically separate chips. The memory 132 may include a volatile memory, such as a static random access memory (SRAM), a dynamic random access memory (DRAM), and the like to temporarily memorize data. In addition, the memory 132 may include a nonvolatile memory device, such as a read only memory (ROM), an erasable programmable ROM (EPROM), an electrically erasable programmable ROM (EEPROM), and the like to store a control program and control data for a long period of time. The processor 131 may include various logic circuits and arithmetic circuits, process data according to a program provided from the memory 132, and generate a control signal according to a result of processing.

Figure 7:
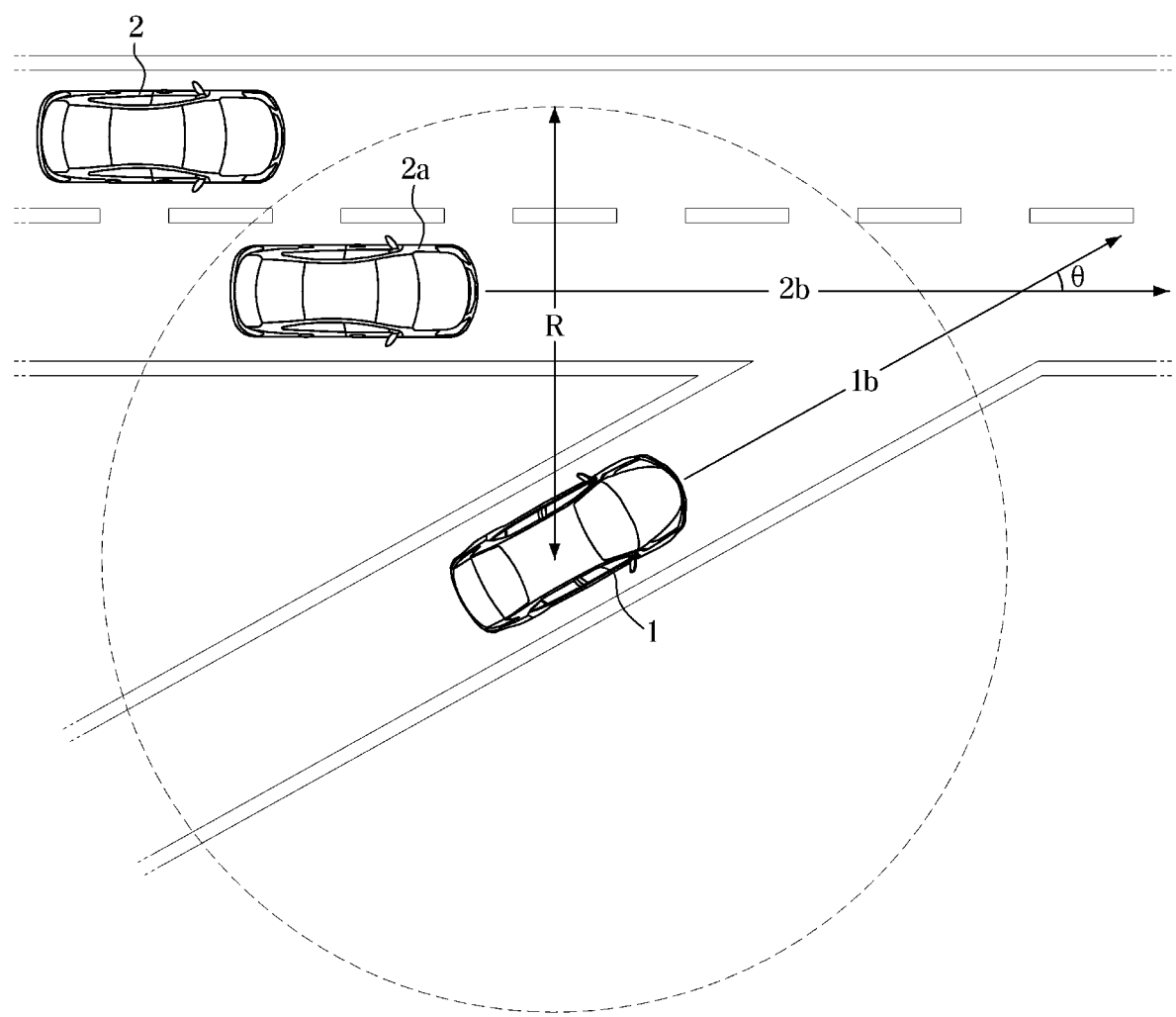
FIG. 7 is a conceptual diagram illustrating an object identification logic of a vehicle according to an embodiment.

FIG. 7 is a conceptual diagram illustrating an object identification logic of a vehicle according to an embodiment.

Referring to FIG. 7, the controller 130 of the vehicle 1 according to an embodiment of the disclosure may, based on processing of at least one of the first sensor data, the second sensor data, or the communication signal, identify the nearby vehicles 2 existing within a predetermined distance (a communication allowable distance, an identifiable allowable distance, etc.). On the other hand, the controller 130 may, based on the processing of the at least one of the first sensor data, the second sensor data, or the communication signal, identify a nearby vehicle 2 at a distance to the vehicle 1 being less than a predetermined distance R. Here, the predetermined distance R may be, for example, a distance at which an object 2a to be controlled among at least one nearby vehicle 2 of the vehicle 1 is identifiable by the controller 130, but the disclosure is not limited thereto.

In addition, the controller 130 may identify a heading direction 2b of the nearby vehicle 2 based on processing of communication with the identified nearby vehicle 2, and identify a heading direction 1b of the vehicle 1 based on processing of the second sensor data, and identify that the heading direction 2b of the nearby vehicle 2 crosses the heading direction 1b of the vehicle 1. Accordingly, the controller 130 may identify the nearby vehicle 2 as an object 2a. However, the disclosure is not limited thereto.

According to another embodiment, the controller 130 may identify a vehicle that is a nearby vehicle 2 existing within a predetermined distance to the vehicle 2 among the nearby vehicles 2 as an object 2a or may identify a nearby vehicle 2 having a heading direction 2b that is expected to cross a heading direction 1b of the vehicle 1 as an object 2a.

The controller 130 may identify an angle θ between the heading direction 1b of the vehicle 1 and the heading direction 2b of the object 2a based on the heading directions 1b and 2b of the vehicle 1 and the object 2a. Accordingly, the controller 130 may control the side mirror 14 of the vehicle 1 based on the angle θ.

Meanwhile, the controller 130 may control the side mirror 14 of the vehicle 1 based on the distance between the vehicle 1 and the object 2a. In more detail, the controller 130 may, in response to the distance between the vehicle 1 and the object 2a being smaller than a predetermined distance, generate a control signal to control the angle of the side mirror 14 of the vehicle 1. Here, the predetermined distance may be provided using a reference value that is smaller than a distance for identifying the object 2a, that is, using a distance at which the side mirror 14 of the vehicle 1 is controlled in response to the vehicle 1 approaching a merging point or the driver feeling uneasy.

Figure 8:
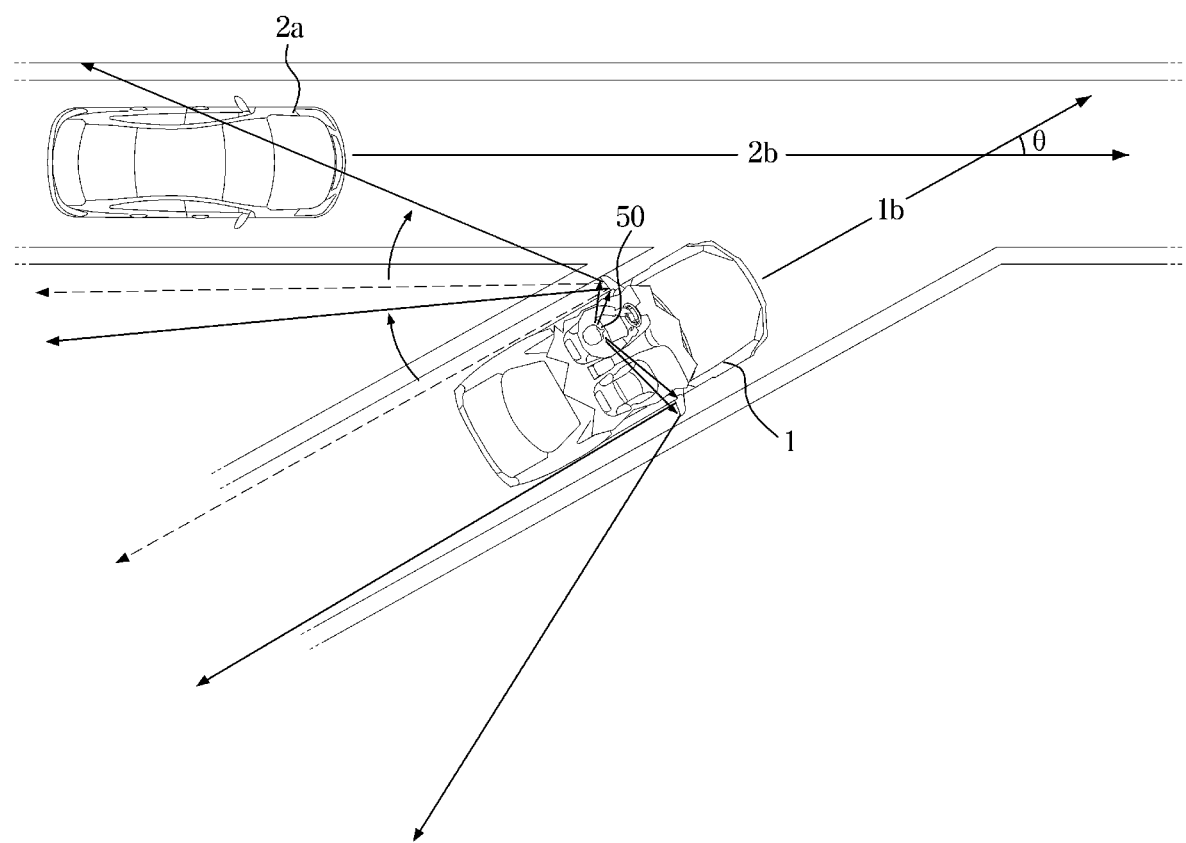
FIGS. 8 to 10 are conceptual diagrams for describing a mirror control activation and deactivation logic of a vehicle according to an embodiment.
Figure 9:
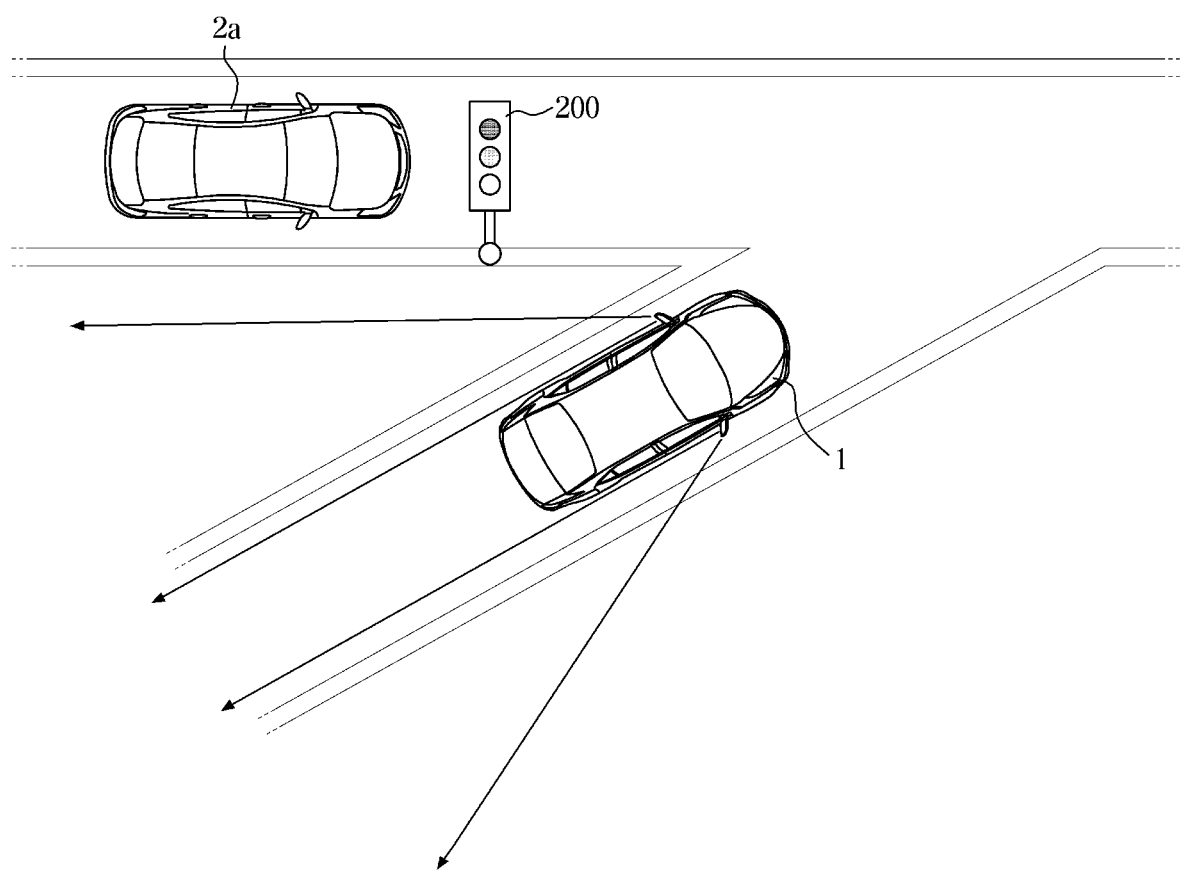
Figure 10:
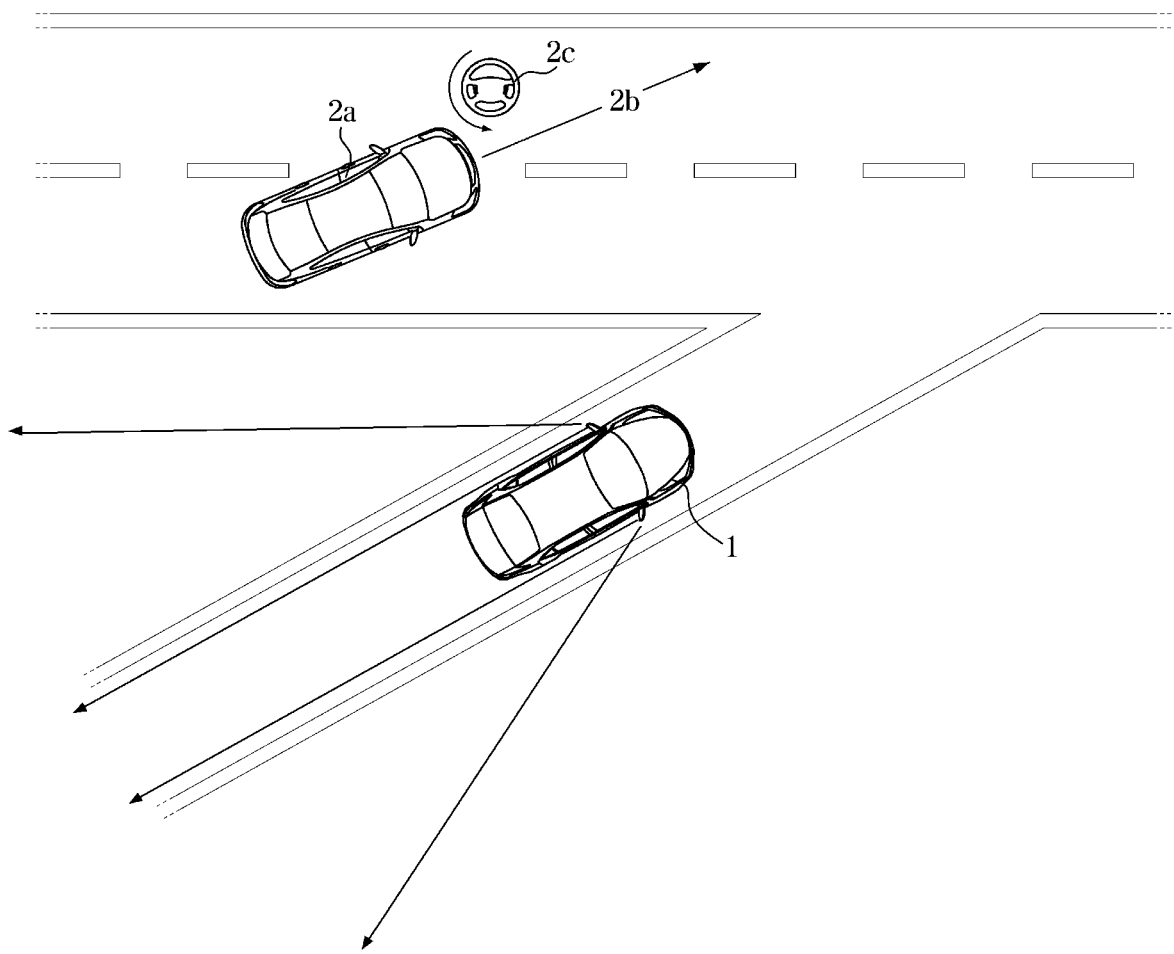

FIGS. 8 to 10 are conceptual diagrams for describing a mirror control activation and deactivation logic of a vehicle according to an embodiment.

Referring to FIG. 8, the controller 130 may control the side mirror 14 of the vehicle 1 based on the distance between the vehicle 1 and the object 2a. More specifically, the controller 130 may generate a control signal to adjust the side mirror 14 based on the angle θ between the heading direction of the vehicle 1 and the heading direction of the object 2a such that the visible angle at the viewpoint 50 of the driver of the vehicle 1 is greater than the angle θ. Here, the visible angle at the viewpoint 50 of the driver of the vehicle 1 refers to an angle formed between the heading direction 1b of the vehicle 1 and a far side from the vehicle 1 in the visible area 50a of the driver. When the visible angle of the vehicle 1 is smaller than or equal to the angle θ between the heading direction of the vehicle 1 and the heading direction of the object 2a, the object 2a is excluded in the visible area 50a of the driver. However, the generation of the control signal may prevent the object 2a from being excluded from the visible area 50a of the driver.

Accordingly, the driver of the vehicle 1 may have a visible area 50*a* that is expanded in the direction in which the object 2*a* approaches, so that the driver may more easily secure the position of the object 2*a*.

Referring to FIG. 9, the controller 130 may, based on identifying of the object 2*a*, perform communication with the infrastructure 200 existing in front of the object 2*a*. Accordingly, the controller 130 may re-identify the object 2*a* based on the communication with the infrastructure 200. That is, the controller 130 may, in response to a traffic signal of the infrastructure 200 corresponding to a "Do not proceed" (red) sign, may deactivate the automatic mirror control of the vehicle 1 because the object 2*a* is unlikely to proceed. In addition, the controller 130 may additionally identify the object 2*a* based on the processing of the communication of the infrastructure 200. However, the disclosure is not limited thereto.

According to another embodiment, the controller 130 may, based on identifying of the object 2*a* and processing of communication with the infrastructure 200, identify a traffic signal of a surrounding of the vehicle 1. Accordingly, the controller 130 may identify activation and/or deactivation of the automatic mirror control function of the vehicle 1.

Referring to FIG. 10, the controller 130 may, based on communication with the nearby vehicles 2, identify the object 2*a*. In addition, the controller 130 may, based on processing of communication with the identified object 2*a*, identify information about the object 2*a*. Here, the information about the object 2*a* may include a heading direction 2*b* of the object 2*a*, steering wheel manipulation information 2*c* of the object 2*a*, and multi-function manipulation information of the object 2*a*.

In more detail, the controller 130 may, based on at least one of the heading direction 2*b* of the object 2*a*, the steering wheel manipulation information 2*c* of the object 2*a*, or the multi-function manipulation information of the object 2*a* obtained based on the processing of the communication of the object 2*a*, identify a lane change intention of the object 2*a*. In addition, the controller 130 may identify the lane change intention of the object 2*a* based on the first sensor data obtained based on the first sensor 111. Here, the lane change intention may refer to a state in which the object 2*a* is expected to perform a lane change or is performing a lane change to a road that is not a road that the vehicle 1 desires to join.

Accordingly, the controller 130 may, upon the lane change intention of the object 2*a* being identified, deactivate the automatic mirror control of the vehicle 1.

A method of controlling a vehicle shown in FIGS. 11 to 14 may be performed by the vehicle 1 described above. Accordingly, even some parts of the description of the vehicle 1 omitted below may be equally applied to the description of the method of controlling the vehicle.

Figure 11:
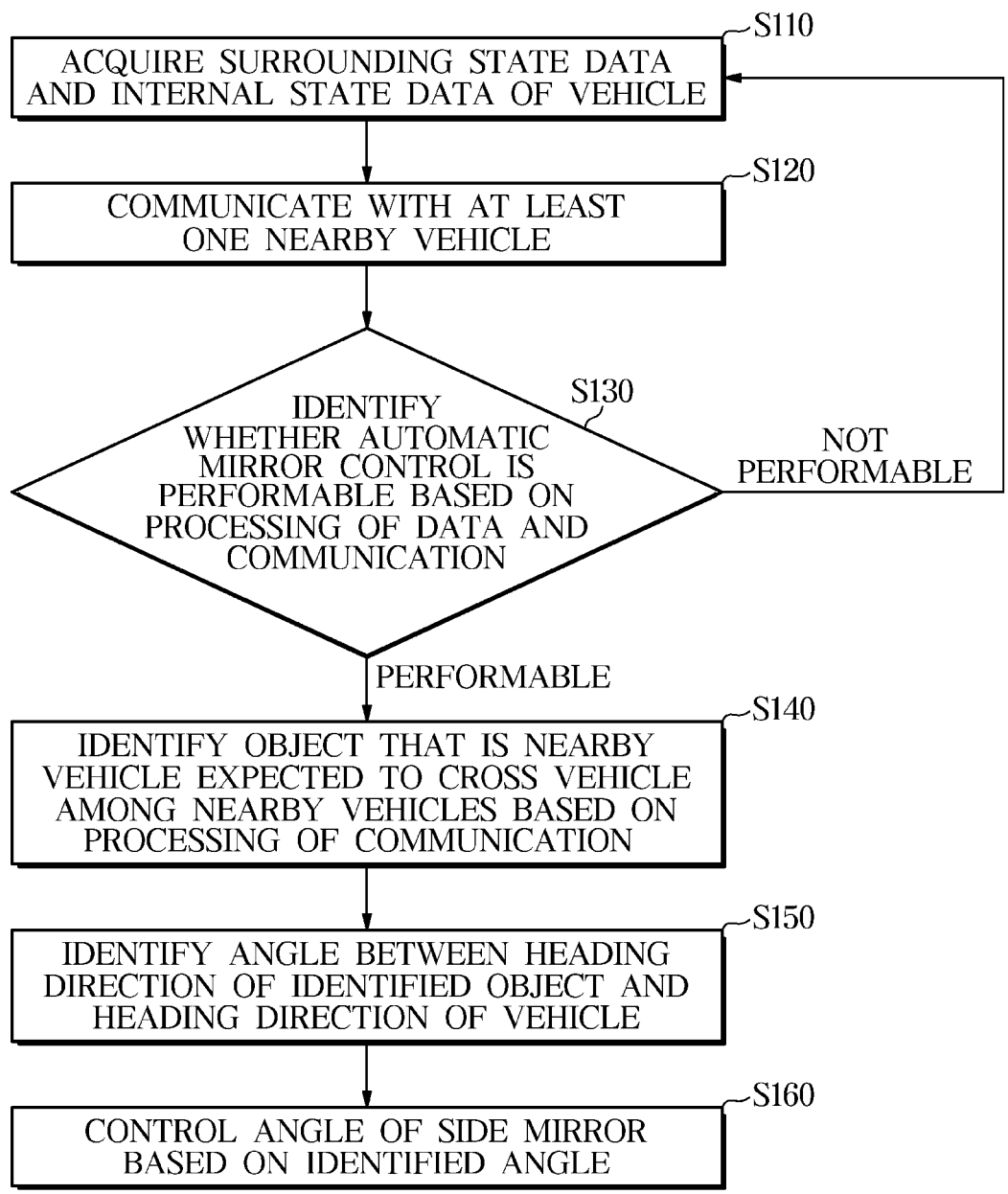
FIG. 11 is a flowchart showing a method of controlling a vehicle according to an embodiment.

FIG. 11 is a flowchart showing a method of controlling a vehicle according to an embodiment.

Figure 12:
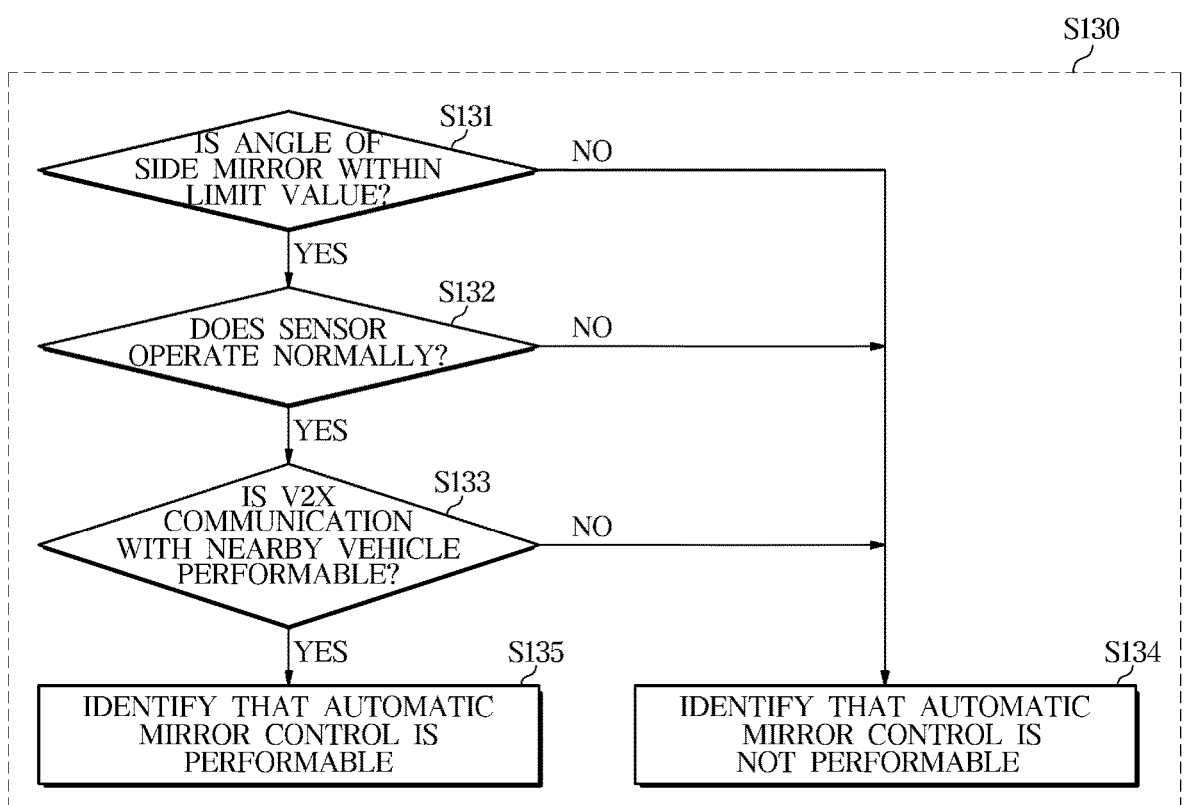
FIG. 12 is a flowchart for describing identifying whether a vehicle automatic mirror control is performable according to an embodiment.

FIG. 12 is a flowchart for describing identifying whether a vehicle automatic mirror control is performable according to an embodiment.

Figure 13:
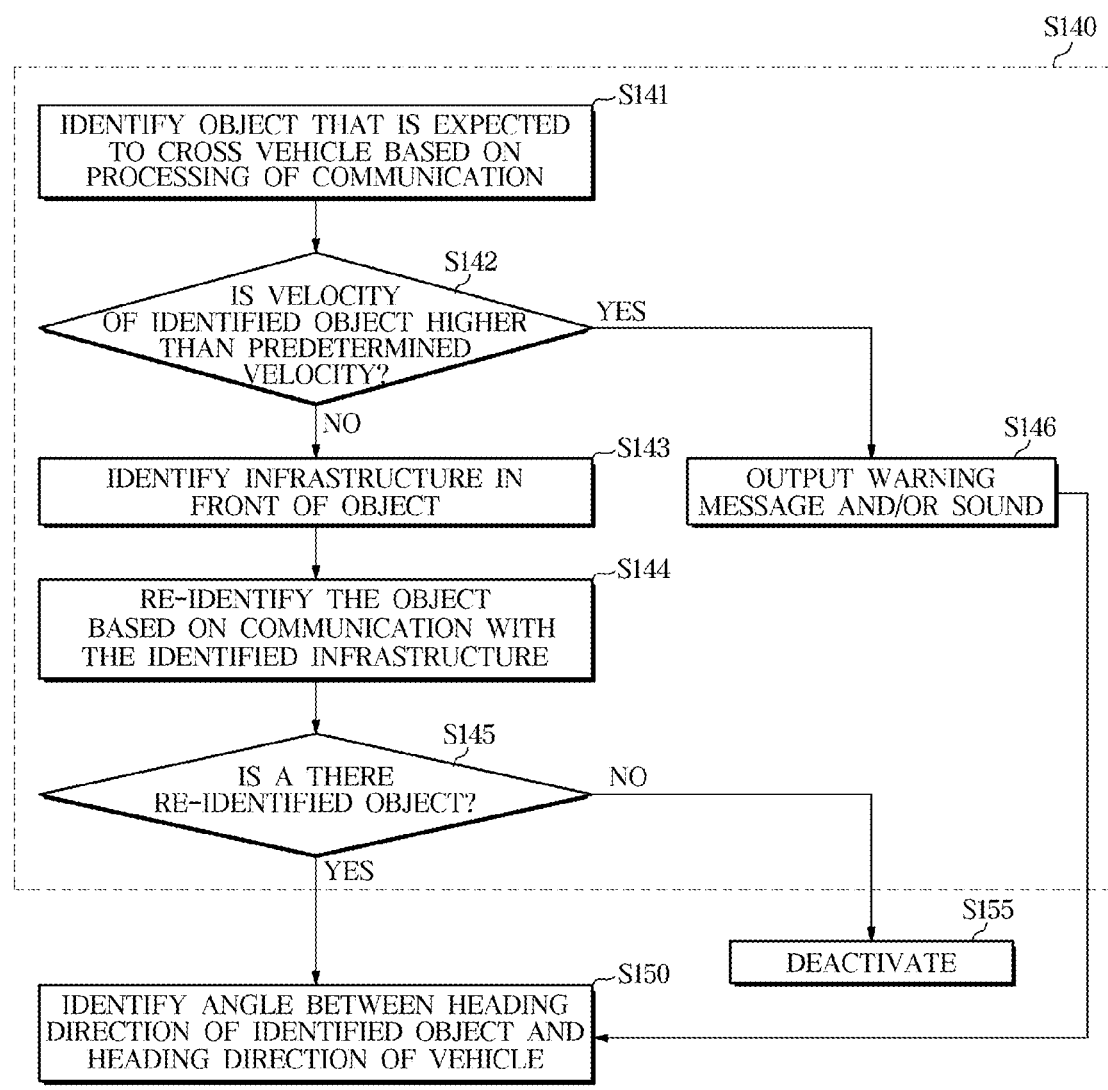
FIG. 13 is a flowchart for describing identifying an object by a vehicle according to an embodiment.

FIG. 13 is a flowchart for describing identifying an object by a vehicle according to an embodiment.

Figure 14:
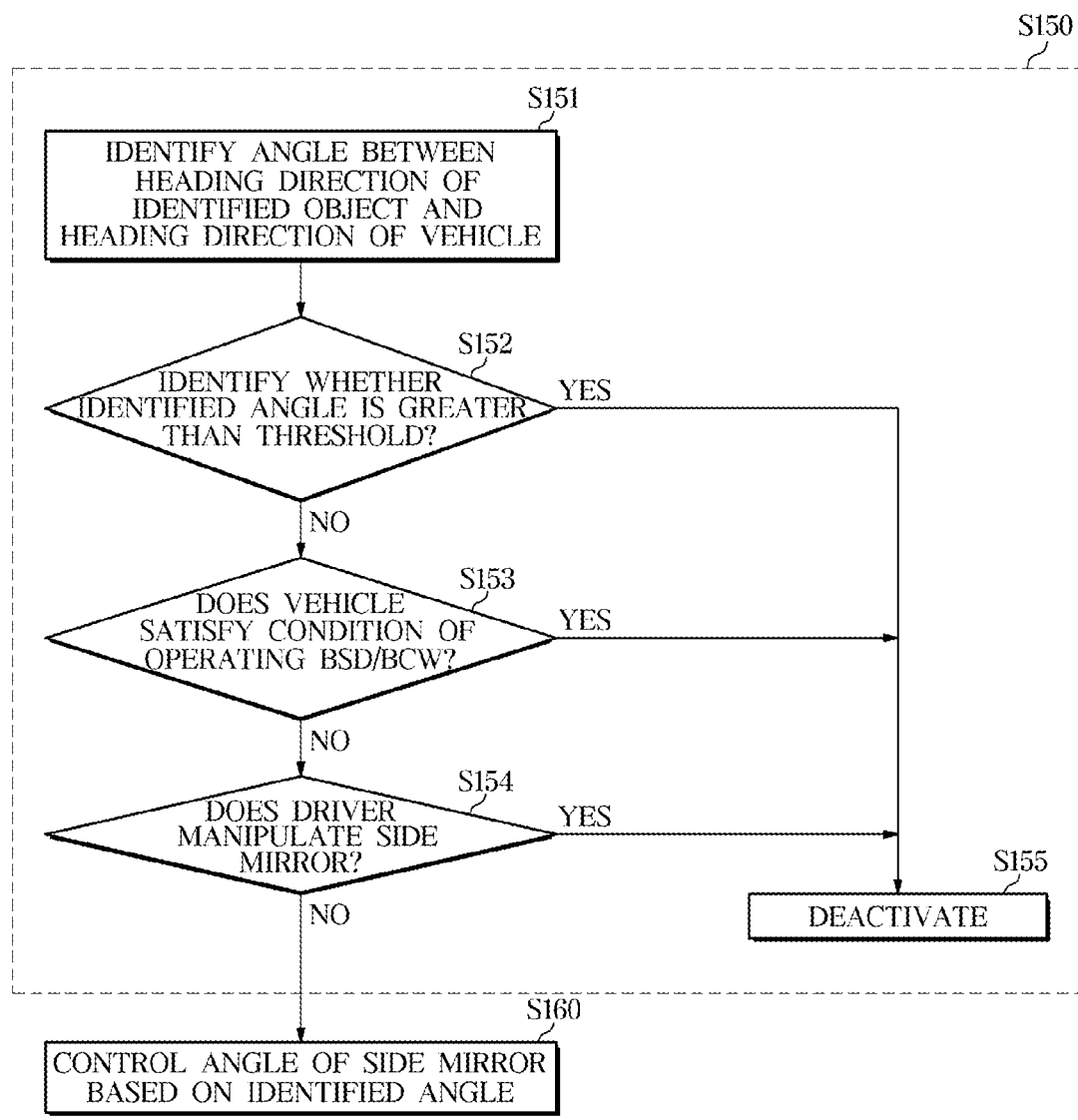
FIG. 14 is a flowchart for describing a vehicle control priority according to an embodiment.

FIG. 14 is a flowchart for describing a vehicle control priority according to an embodiment.

Referring to FIG. 11, the vehicle 1 may acquire surrounding state data (the first sensor data) of the vehicle 1 and/or internal state data (the second sensor data) of the vehicle 1 through the first sensor nil and/or the second sensor 112 installed in the vehicle 1 (S110).

In addition, the vehicle 1 may communicate with at least one nearby vehicle 2 (S120).

In addition, the vehicle 1 may identify whether the automatic mirror control is performable based on the processing of the first sensor data, the second sensor data, and the communication signal (S130).

In addition, the vehicle 1 may, in response to identifying that the automatic mirror control is not performable, acquire surrounding state data and internal state data of the vehicle 1 (S110).

In addition, the vehicle 1 may, in response to identifying that the automatic mirror control is performable, identify an object 2*a* that is a nearby vehicle 2*a* expected to cross the vehicle 1 among the nearby vehicles 2 based on processing of the communication (S140).

In addition, the vehicle 1 may identify the angle θ between the heading direction 2*b* of the identified object 2*a* and the heading direction 1*b* of the vehicle 1 (S150).

In addition, the vehicle 1 may control the angle of the side mirror 14 based on the identified angle θ (S160).

Referring to FIG. 12, the vehicle 1 may identify whether the angle of the side mirror 14 of the vehicle 1 is within a limit value (S131).

In addition, the vehicle 1 may identify whether the sensor 110 of the vehicle 1 operates normally (S132).

In addition, the vehicle 1 may identify whether V2X communication with the nearby vehicle 2 is performable (S133).

In addition, the vehicle 1 may, in response to at least one of: a case in which the angle of the side mirror 14 of the vehicle 1 is outside the limit value, a case in which the sensor 110 operates abnormally, or a case in which V2X communication with the nearby vehicle 2 is not performable, identify that the automatic mirror control of the vehicle 1 is not performable (S134).

In addition, the vehicle 1 may, in response to the angle of the side mirror of the vehicle 1 being within the limit value, the sensor 110 operating normally, and V2X communication with the nearby vehicle 2 being performable, identify that the automatic mirror control is performable (S135).

Referring to FIG. 13, the vehicle 1 may identify an object 2*a* expected to cross the vehicle 1 based on processing of communication (S141).

In addition, the vehicle 1 may identify whether the velocity of the identified object 2*a* is higher than a predetermined velocity (S142).

In addition, the vehicle 1 may, in response to the velocity of the identified object 2*a* being higher than the predetermined velocity, transmit a warning message and/or sound to the display device 170 and/or the audio device 180 of the vehicle 1 (S146).

In addition, the vehicle may, in response to the velocity of the identified object 2*a* being lower than the predetermined velocity, identify the infrastructure 200 in front of the object 2*a* (S143).

In addition, the vehicle 1 may re-identify the object 2*a* based on communication with the identified infrastructure 200 (S144).

In addition, the vehicle 1 may identify whether there is a re-identified object 2*a* (S145).

In addition, the vehicle 1 may, in response to identifying that there is a re-identified object 2*a*, identify the angle θ between the heading direction 2*b* of the identified object 2*a* and the heading direction 1*b* of the vehicle 1 (S150).

In addition, the vehicle 1 may, in response to identifying that there is no re-identified object 2*a*, deactivate the automatic mirror control of the vehicle 1 (S154).

Referring to FIG. 14, the vehicle 1 may identify the angle θ between the heading direction 2b of the identified object 2a and the heading direction 1b of the vehicle 1 (S151).

In addition, the vehicle 1 may identify whether the identified angle θ is greater than a threshold value (a threshold angle) (S152).

In addition, the vehicle 1 may identify whether the vehicle 1 operates a collision warning system (BSD, BCW, etc.) (S153).

In addition, the vehicle 1 may identify whether the driver is controlling the side mirror 14 (S154).

In addition, the vehicle 1 may deactivate the automatic mirror control of the vehicle 1, in response to at least one of: a case in which the identified angle θ is greater than the threshold value, a case in which the vehicle 1 satisfies a condition of operating the collision warning system, or a case in which the driver is controlling the side mirror 14 (S155).

Further, the vehicle 1 may, in response to the identified angle θ being within the threshold value, the condition of operating the collision warning system not being satisfied, and the driver not controlling the side mirror 14, control the angle of the side mirror 14 based on the identified angle θ (S160).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the vehicle and the method of controlling the same can provide convenience to the driver by controlling a side mirror at a vehicle merging road section based on vehicle to everything (V2X) communication.

Although embodiments of the present disclosure have been described for illustrative purposes, those skilled in the art will appreciate that various modifications, additions and substitutions are performable, without departing from the scope and spirit of the disclosure. Therefore, embodiments of the present disclosure have not been described for limiting purposes.

What is claimed is:

1. A vehicle comprising:
a sensor configured to acquire surrounding state data of the vehicle and internal state data of the vehicle;
a communicator configured to communicate with at least one nearby vehicle;
a side mirror having an angle that is adjustable in at least one of a horizontal direction or a vertical direction; and
a controller comprising a processor, wherein the controller is configured to:
identify whether an automatic mirror control of the vehicle is performable based on the surrounding state data, the internal state data, and a first communication between the communicator and the nearby vehicle processed by the processor;
in response to identifying that the automatic mirror control of the vehicle is performable:
identify that the nearby vehicle is expected to cross the vehicle based on the first communication;
identify a first angle between a heading direction of the nearby vehicle and a heading direction of the vehicle; and
control a second angle of the side mirror based on the first angle,
wherein:
the controller is further configured to identify the nearby vehicle expected to cross the vehicle based on at least one of information about driver manipulation of a multi-function switch of the nearby vehicle or information about driver manipulation of a steering wheel of the nearby vehicle based on the first communication, and
the information about driver manipulation of the multi-function switch and the information about driver manipulation of the steering wheel are used as driver manipulation information for identifying an intention for lane change of the nearby vehicle, and
wherein the controller is further configured to:
communicate with an infrastructure in front of the nearby vehicle to obtain a traffic signal, the traffic signal indicating whether the nearby vehicle is allowed to proceed onto a road where a crossing with the vehicle and the nearby vehicle is expected; and
identify the nearby vehicle expected to cross the vehicle based on a second communication between the communicator and the infrastructure processed by the processor.

2. The vehicle of claim 1, wherein the controller is further configured to identify whether the automatic mirror control of the vehicle is performable based on at least one of the second angle of the side mirror, whether the sensor is normal, or a communication state with the nearby vehicle.

3. The vehicle of claim 1, wherein the controller is further configured to control the second angle of the side mirror in response to the first angle between the vehicle and the nearby vehicle being greater than or equal to a predetermined angle.

4. The vehicle of claim 1, wherein the controller is further configured to identify the nearby vehicle expected to cross the vehicle based on a velocity of the nearby vehicle based on the first communication.

5. The vehicle of claim 1, wherein the controller is further configured to:
identify a visible area of a driver of the vehicle based on the surrounding state data and the internal state data processed by the processor; and
control the second angle of the side mirror to include the nearby vehicle in the identified visible area.

6. The vehicle of claim 1, wherein the controller is further configured to identify that the automatic mirror control of the vehicle is not performable in response to at least one of an operation of a rear collision warning system of the vehicle or an adjustment of the second angle of the side mirror by a driver being identified based on the surrounding state data and the internal state data processed by the processor.

7. The vehicle of claim 1, wherein the controller is further configured to generate a control signal for controlling a display device or an audio device of the vehicle in response to a velocity of the nearby vehicle being greater than or equal to a predetermined velocity.

8. The vehicle of claim 1, wherein the controller is further configured to control the side mirror at a third angle of the side mirror before the control in response to identifying that the nearby vehicle is not expected to cross the vehicle based on the surrounding state data and the internal state data processed by the processor.

9. A method of controlling a vehicle, the method comprising:
sensing surrounding state data of the vehicle and internal state data of the vehicle;
communicating with a nearby vehicle;
identifying whether an automatic mirror control of the vehicle is performable based on processing of the surrounding state data and the internal state data and a first communication with the nearby vehicle;
in response to identifying that the automatic mirror control of the vehicle is performable, identifying that the nearby vehicle is expected to cross the vehicle based on the first communication;
identifying a first angle between a heading direction of the nearby vehicle and a heading direction of the vehicle; and
controlling a second angle of a side mirror based on the first angle,
wherein:
identifying that the nearby vehicle is expected to cross the vehicle is based on at least one of information about driver manipulation of a multi-function switch of the nearby vehicle or information about driver manipulation of a steering wheel of the nearby vehicle based on the first communication, and
the information about driver manipulation of the multi-function switch and the information about driver manipulation of the steering wheel are used as driver manipulation information for identifying an intention for lane change of the nearby vehicle,
the method further communicating with an infrastructure in front of the nearby vehicle to obtain a traffic signal, the traffic signal indicating whether the nearby vehicle is allowed to proceed onto a road where a crossing with the vehicle and the nearby vehicle is expected,
wherein identifying that the nearby vehicle is expected to cross the vehicle is based on processing of a second communication with the infrastructure.

10. The method of claim 9, wherein identifying whether the automatic mirror control of the vehicle is performable comprises identifying whether the automatic mirror control of the vehicle is performable based on at least one of the second angle of the side mirror, whether a sensor is normal, or a communication state with the nearby vehicle.

11. The method of claim 9, wherein controlling the second angle of the side mirror is performed in response to the first angle between the vehicle and the nearby vehicle being greater than or equal to a predetermined angle.

12. The method of claim 9, wherein identifying that the nearby vehicle is expected to cross the vehicle is further based on a velocity of the nearby vehicle based on the first communication.

13. The method of claim 9, further comprising identifying a visible area of a driver of the vehicle based on the internal state data of the vehicle, wherein controlling the second angle of the side mirror comprises controlling the second angle of the side mirror to include the nearby vehicle in the visible area.

14. The method of claim 9, wherein identifying whether the automatic mirror control of the vehicle is performable comprises identifying that the automatic mirror control of the vehicle is not performable in response to at least one of an operation of a rear collision warning system of the vehicle or an adjustment of the second angle of the side mirror by a driver being identified based on the surrounding state data and the internal state data.

15. The method of claim 9, further comprising generating a control signal for controlling at least one of a display device or an audio device of the vehicle in response to a velocity of the nearby vehicle being greater than or equal to a predetermined velocity.

16. The method of claim 9, further comprising controlling the side mirror at a third angle of the side mirror before the control in response to identifying that the nearby vehicle is not expected to cross the vehicle based on the surrounding state data and the internal state data.

17. A computer readable recording medium on which a program for executing the method of claim 9 is recorded.

18. A system for controlling an adjustable side mirror of a vehicle, the system comprising:
a sensor configured to acquire surrounding state data of the vehicle and internal state data of the vehicle;
a communicator configured to communicate with at least one nearby vehicle; and
a controller comprising a processor, wherein the controller is configured to:
identify whether an automatic mirror control of the vehicle is performable based on the surrounding state data, the internal state data, and a first communication between the communicator and the nearby vehicle processed by the processor;
in response to identifying that the automatic mirror control of the vehicle is performable;
identify that a nearby vehicle of the nearby vehicles is expected to cross the vehicle based on the first communication;
identify a first angle between a heading direction of the nearby vehicle expected to cross the vehicle and a heading direction of the vehicle; and
control a second angle of the adjustable side mirror based on the first angle,
wherein:
the controller is further configured to identify the nearby vehicle expected to cross the vehicle based on at least one of information about driver manipulation of a multi-function switch of the nearby vehicle or information about driver manipulation of a steering wheel of the nearby vehicle based on the first communication, and
the information about driver manipulation of the multi-function switch and the information about driver manipulation of the steering wheel are used as driver manipulation information for identifying an intention for lane change of the nearby vehicle,
wherein the controller is further configured to:
communicate with an infrastructure in front of the nearby vehicle to obtain a traffic signal, the traffic signal indicating whether the nearby vehicle is allowed to proceed onto a road where a crossing with the vehicle and the nearby vehicle is expected; and
identify the nearby vehicle expected to cross the vehicle based on a second communication between the communicator and the infrastructure processed by the processor.

* * * * *